United States Patent
Cao et al.

(10) Patent No.: US 10,575,251 B2
(45) Date of Patent: Feb. 25, 2020

(54) CAPABILITY INDICATION METHOD, ROUTE SETUP METHOD, MOBILE TERMINAL, AND NETWORK DEVICE

(71) Applicant: Huawei Technologies Co., Ltd., Shenzhen, Guangdong (CN)

(72) Inventors: Yongzhao Cao, Shanghai (CN); Fangfu Guo, Shanghai (CN); Lei Gu, Shanghai (CN); Chi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/898,090

(22) Filed: Feb. 15, 2018

(65) Prior Publication Data
US 2018/0176863 A1 Jun. 21, 2018

Related U.S. Application Data

(63) Continuation of application No. PCT/CN2016/083943, filed on May 30, 2016.

(30) Foreign Application Priority Data

Aug. 20, 2015 (CN) .......................... 2015 1 0515546

(51) Int. Cl.
| | |
|---|---|
| H04W 52/02 | (2009.01) |
| H04W 40/10 | (2009.01) |
| H04W 48/12 | (2009.01) |
| H04W 72/04 | (2009.01) |
| H04W 76/36 | (2018.01) |
| H04W 8/00 | (2009.01) |
| H04W 88/04 | (2009.01) |

(52) U.S. Cl.
CPC ....... *H04W 52/0219* (2013.01); *H04W 40/10* (2013.01); *H04W 48/12* (2013.01);
(Continued)

(58) Field of Classification Search
CPC ..... H04W 88/04; H04W 40/22; H04W 72/02; H04W 72/048; H04W 72/1278;
(Continued)

(56) References Cited

U.S. PATENT DOCUMENTS

2014/0335791 A1* 11/2014 Kim ..................... H04W 4/023
455/41.2
2015/0133112 A1 5/2015 Wang et al.
(Continued)

FOREIGN PATENT DOCUMENTS

| CN | 101207537 A | 6/2008 |
|---|---|---|
| CN | 101562861 A | 10/2009 |

(Continued)

OTHER PUBLICATIONS

ZTE,"Transmission resource configuration for D2D discovery," R2-142152, 3GPP TSG-RAN WG2 Meeting #86, Seoul, South Korea, May 19-23, 2014, 5 pages.

*Primary Examiner* — Rownak Islam
(74) *Attorney, Agent, or Firm* — Slater Matsil, LLP

(57) ABSTRACT

The embodiments of the present disclosure relates to the communications field, and discloses a capability indication method, a route setup method, a mobile terminal, and a network device, so as to save electricity of a mobile terminal in a D2D mesh network. A specific solution is as follows: A network device sends first indication information to a mobile terminal, where the first indication information is used to indicate that a communications network in which the network device is located supports communication between mobile terminals having a multi-hop capability, and the mobile terminal having the multi-hop capability is a mobile terminal having a capability of directly communicating with one or more mobile terminals. Embodiments of the present disclosure are applied to D2D communication.

20 Claims, 7 Drawing Sheets

---

A network device sends first indication information to a mobile terminal, where the first indication information is used by the network device to indicate to the mobile terminal that a communications network in which the network device is located supports communication between mobile terminals having a multi-hop capability — 101

(52) U.S. Cl.
CPC .......... *H04W 72/048* (2013.01); *H04W 8/005* (2013.01); *H04W 76/36* (2018.02); *H04W 88/04* (2013.01)

(58) Field of Classification Search
CPC ..... H04W 76/14; H04W 76/36; H04W 8/005; H04W 40/246; H04W 40/10; H04W 48/12; H04W 52/0219; Y02D 70/39; Y02D 70/142; Y02D 70/146; Y02D 70/22; Y02D 70/20; Y02D 70/1224; Y02D 70/1262; Y02D 70/21
USPC .......................................................... 370/311
See application file for complete search history.

(56) References Cited

U.S. PATENT DOCUMENTS

| | | | |
|---|---|---|---|
| 2015/0271675 A1* | 9/2015 | Cheng | H04W 8/005 455/410 |
| 2015/0289191 A1 | 10/2015 | Wang et al. | |
| 2016/0183286 A1* | 6/2016 | Park | H04W 72/02 370/329 |
| 2016/0234671 A1 | 8/2016 | Chai et al. | |
| 2017/0150501 A1* | 5/2017 | Park | H04L 1/1861 |
| 2017/0181206 A1* | 6/2017 | Lee | H04W 76/14 |
| 2017/0295567 A1* | 10/2017 | Chen | H04W 76/11 |

FOREIGN PATENT DOCUMENTS

| | | |
|---|---|---|
| CN | 101772199 A | 7/2010 |
| CN | 102137013 A | 7/2011 |
| CN | 103096503 A | 5/2013 |
| CN | 103415056 A | 11/2013 |
| CN | 103580791 A | 2/2014 |
| CN | 103906032 A | 7/2014 |
| EP | 2866369 A1 | 4/2015 |
| WO | 2014111896 A2 | 7/2014 |

* cited by examiner

A network device sends first indication information to a mobile terminal, where the first indication information is used by the network device to indicate to the mobile terminal that a communications network in which the network device is located supports communication between mobile terminals having a multi-hop capability — 101

FIG. 1

A mobile terminal receives first indication information sent by a network device, where the first indication information is used by the network device to indicate to the mobile terminal that a communications network in which the network device is located supports communication between mobile terminals having a multi-hop capability — 201

FIG. 2

A mobile terminal sends second indication information to a network device, where the second indication information is used by the mobile terminal to indicate to the network device that the mobile terminal is a mobile terminal having a multi-hop capability — 301

FIG. 3

A network device receives second indication information sent by a mobile terminal, where the second indication information is used by the mobile terminal to indicate to the network device that the mobile terminal is a mobile terminal having a multi-hop capability — 401

FIG. 4

```
┌─────────────────────────────────────────────────┐
│ A first mobile terminal receives a first neighbor discovery and setup │
│ message sent by a second mobile terminal, where the first neighbor    │
│ discovery and setup message carries an identifier of a destination    │──── 501
│ mobile terminal and parameter information corresponding to the        │
│ identifier of the destination mobile terminal                         │
└─────────────────────────────────────────────────┘
                              │
                              ▼
┌─────────────────────────────────────────────────┐
│ The first mobile terminal sets up a route to the destination mobile   │
│ terminal according to the identifier of the destination mobile terminal │──── 502
│ and the parameter information corresponding to the identifier of the  │
│ destination mobile terminal                                           │
└─────────────────────────────────────────────────┘
```

FIG. 5

```
┌─────────────────────────────────────────────────┐
│ A first mobile terminal receives a first neighbor discovery and setup │
│ message sent by a second mobile terminal, where the first neighbor    │
│ discovery and setup message carries an identifier of each mobile      │──── 601
│ terminal in a mobile terminal set and signal quality information, of  │
│ the mobile terminal, corresponding to the identifier of the mobile    │
│ terminal                                                              │
└─────────────────────────────────────────────────┘
                              │
                              ▼
┌─────────────────────────────────────────────────┐
│ The first mobile terminal sets up a relay route from the first mobile │
│ terminal to a network device according to the signal quality          │
│ information, of each mobile terminal, corresponding to the identifier │──── 602
│ of the mobile terminal in the mobile terminal set and signal quality  │
│ information of the first mobile terminal                              │
└─────────────────────────────────────────────────┘
```

FIG. 6

```
┌─────────────────────────┐
│ Network device          │
│  ┌───────────────────┐  │
│  │ Sending unit 71   │  │
│  └───────────────────┘  │
└─────────────────────────┘
```

FIG. 7

CAPABILITY INDICATION METHOD, ROUTE SETUP METHOD, MOBILE TERMINAL, AND NETWORK DEVICE

CROSS-REFERENCE TO RELATED APPLICATIONS

This application is a continuation of International Application No. PCT/CN2016/083943, filed on May 30, 2016, which claims priority to Chinese Patent Application No. 201510515546.5, filed on Aug. 20, 2015. The disclosures of the aforementioned applications are hereby incorporated by reference in their entireties.

TECHNICAL FIELD

The embodiments of the application relates to the communications field, and in particular, to a capability indication method, a route setup method, a mobile terminal, and a network device.

BACKGROUND

A mesh network may be combined with multiple types of broadband wireless access technologies. Moreover, after the mesh network is combined with a broadband wireless access technology, a coverage area of a wireless system can be greatly increased, and a bandwidth capacity and communication reliability of the wireless system can also be improved. Therefore, the mesh network has become a key subject for research in the communications field and academic circle. In addition, with continuous development of mobile communications technologies, Long Term Evolution (LTE) has become a mainstream wireless communications technology currently. A device-to-device (D2D) technology in LTE is considered as an important feature, and standardization work is performed on the D2D technology. The D2D technology is an end-to-end direct communication technology. A greatest difference between the D2D technology and a conventional cellular communications technology lies in that, based on the D2D technology, mobile terminals (for example, user equipments (UEs)) can directly communicate with each other, and forwarding by a base station is not needed any longer. Moreover, with continuous development of society, a quantity of mobile terminals in a mobile communications network is also increasing rapidly. This undoubtedly increases network load of the mobile communications network greatly. In this case, due to a unique advantage of the D2D technology, the D2D technology becomes a preferred technology for reducing load of the mobile communications network.

It is widely known that, in an existing Wireless Fidelity (Wi-Fi) mesh network, the WiFi mesh network is mainly used for backbone backhaul, and there is no power consumption problem. However, in a D2D mesh network formed by combining a mesh network and a D2D technology, power consumption of a mobile terminal is a key factor affecting user experience. Therefore, in the D2D mesh network, how to save electricity of a mobile terminal has become a problem that urgently needs to be resolved in the art.

SUMMARY

The embodiments of the application provides a capability indication method, a route setup method, a mobile terminal, and a network device, so as to save electricity of a mobile terminal in a D2D mesh network.

To achieve the foregoing objective, the embodiments of the application adopts the following technical solutions:

A first aspect of the embodiments of the application provides a capability indication method, including:

sending, by a network device, first indication information to a mobile terminal, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

With reference to the first aspect, in a possible implementation, the sending, by a network device, first indication information to a mobile terminal includes:

sending, by the network device, a system message to the mobile terminal, where the system message carries the first indication information, and the system message includes at least one of the following: a master information block MIB or a system information block SIB; or sending, by the network device, a dedicated radio resource control RRC message to the mobile terminal, where the dedicated RRC message carries the first indication information; or sending, by the network device, a management frame to the mobile terminal, where the management frame carries the first indication information; or sending, by the network device, a management message to the mobile terminal, where the management message carries the first indication information.

With reference to the first aspect or the foregoing possible implementation, in another possible implementation, the method further includes:

receiving, by the network device, second indication information sent by the mobile terminal, where the second indication information is used by the mobile terminal to indicate to the network device that the mobile terminal is the mobile terminal having the multi-hop capability.

With reference to the first aspect or the foregoing possible implementations, in another possible implementation, after the sending, by a network device, first indication information to a mobile terminal, the method further includes:

receiving, by the network device, first related information sent by the mobile terminal, where the first related information is used by the mobile terminal to apply to the network device for a multi-hop resource and/or is used by the mobile terminal to indicate that the mobile terminal has a multi-hop requirement.

With reference to the first aspect or the foregoing possible implementations, in another possible implementation, after the sending, by a network device, first indication information to a mobile terminal, the method further includes:

receiving, by the network device, second related information sent by the mobile terminal, where the second related information is used by the mobile terminal to apply to the network device for release of a multi-hop resource and/or is used by the mobile terminal to indicate that the mobile terminal has no multi-hop requirement.

A second aspect of the embodiments of the application provides a capability indication method, including:

receiving, by a mobile terminal, first indication information sent by a network device, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

With reference to the second aspect, in a possible implementation, the method further includes:

sending, by the mobile terminal, second indication information to the network device, where the second indication information is used by the mobile terminal to indicate to the network device that the mobile terminal is the mobile terminal having the multi-hop capability.

With reference to the second aspect or the foregoing possible implementation, in another possible implementation, the sending, by the mobile terminal, second indication information to the network device includes:

sending, by the mobile terminal, the second indication information to the network device by using a dedicated radio resource control RRC message.

With reference to the second aspect or the foregoing possible implementations, in another possible implementation, after the receiving, by a mobile terminal, first indication information sent by a network device, the method further includes:

sending, by the mobile terminal, first related information to the network device, where the first related information is used by the mobile terminal to apply to the network device for a multi-hop resource and/or is used by the mobile terminal to indicate that the mobile terminal has a multi-hop requirement.

With reference to the second aspect or the foregoing possible implementations, in another possible implementation, the sending, by the mobile terminal, first related information to the network device includes:

sending, by the mobile terminal, the first related information to the network device by using a dedicated RRC message.

With reference to the second aspect or the foregoing possible implementations, in another possible implementation, before the sending, by the mobile terminal, first related information to the network device, the method further includes:

determining, by the mobile terminal, that the mobile terminal has the multi-hop requirement and/or determining that a multi-hop capability switch is in an enabled state.

With reference to the second aspect or the foregoing possible implementations, in another possible implementation, the method further includes:

determining, by the mobile terminal, that the mobile terminal has no multi-hop requirement and/or determining that the multi-hop capability switch is in a disabled state; and sending, by the mobile terminal, second related information to the network device, where the second related information is used by the mobile terminal to apply to the network device for release of a multi-hop resource and/or is used by the mobile terminal to indicate that the mobile terminal has no multi-hop requirement.

A third aspect of the embodiments of the application provides a capability indication method, including:

sending, by a mobile terminal, second indication information to a network device, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

With reference to the third aspect, in a possible implementation, the sending, by a mobile terminal, second indication information to a network device includes:

sending, by the mobile terminal, the second indication information to the network device by using a dedicated radio resource control RRC message.

With reference to the third aspect or the foregoing possible implementation, in another possible implementation, the method further includes:

receiving, by the mobile terminal, first indication information sent by the network device, where the first indication information is used by the network device to indicate to the mobile terminal that a communications network in which the network device is located supports communication between mobile terminals having the multi-hop capability.

With reference to the third aspect or the foregoing possible implementations, in another possible implementation, after the sending, by a mobile terminal, second indication information to a network device, the method further includes:

sending, by the mobile terminal, first related information to the network device, where the first related information is used by the mobile terminal to apply to the network device for a multi-hop resource and/or is used by the mobile terminal to indicate that the mobile terminal has a multi-hop requirement.

With reference to the third aspect or the foregoing possible implementations, in another possible implementation, the sending, by the mobile terminal, first related information to the network device includes:

sending, by the mobile terminal, the first related information to the network device by using a dedicated RRC message.

With reference to the third aspect or the foregoing possible implementations, in another possible implementation, before the sending, by the mobile terminal, first related information to the network device, the method further includes:

determining, by the mobile terminal, that the mobile terminal has the multi-hop requirement and/or determining that a multi-hop capability switch is in an enabled state.

With reference to the third aspect or the foregoing possible implementations, in another possible implementation, the method further includes:

determining, by the mobile terminal, that the mobile terminal has no multi-hop requirement and/or determining that the multi-hop capability switch is in a disabled state; and sending, by the mobile terminal, second related information to the network device, where the second related information is used by the mobile terminal to apply to the network device for release of a multi-hop resource and/or is used by the mobile terminal to indicate that the mobile terminal has no multi-hop requirement.

A fourth aspect of the embodiments of the application provides a capability indication method, including:

receiving, by a network device, second indication information sent by a mobile terminal, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

With reference to the fourth aspect, in a possible implementation, the method further includes:

sending, by the network device, first indication information to the mobile terminal, where the first indication information is used by the network device to indicate to the mobile terminal that a communications network in which the network device is located supports communication between mobile terminals having the multi-hop capability.

With reference to the fourth aspect or the foregoing possible implementation, in another possible implementation, the sending, by the network device, first indication information to the mobile terminal includes:

sending, by the network device, a system message to the mobile terminal, where the system message carries the first indication information, and the system message includes at least one of the following: a master information block MIB or a system information block SIB; or sending, by the network device, a dedicated radio resource control RRC message to the mobile terminal, where the dedicated RRC message carries the first indication information; or sending, by the network device, a management frame to the mobile terminal, where the management frame carries the first indication information; or sending, by the network device, a management message to the mobile terminal, where the management message carries the first indication information.

With reference to the fourth aspect or the foregoing possible implementations, in another possible implementation, after the receiving, by a network device, second indication information sent by a mobile terminal, the method further includes:

receiving, by the network device, first related information sent by the mobile terminal, where the first related information is used by the mobile terminal to apply to the network device for a multi-hop resource and/or is used by the mobile terminal to indicate that the mobile terminal has a multi-hop requirement.

With reference to the fourth aspect or the foregoing possible implementations, in another possible implementation, after the receiving, by a network device, second indication information sent by a mobile terminal, the method further includes:

receiving, by the network device, second related information sent by the mobile terminal, where the second related information is used by the mobile terminal to apply to the network device for release of a multi-hop resource and/or is used by the mobile terminal to indicate that the mobile terminal has no multi-hop requirement.

A fifth aspect of the embodiments of the application provides a route setup method, including:

receiving, by a first mobile terminal, a first neighbor discovery and setup message sent by a second mobile terminal, where the first neighbor discovery and setup message carries an identifier of a destination mobile terminal and parameter information corresponding to the identifier of the destination mobile terminal, the second mobile terminal is a mobile terminal that is directly adjacent to the first mobile terminal, and the destination mobile terminal is a mobile terminal that is directly or indirectly adjacent to the second mobile terminal; and setting up, by the first mobile terminal, a route to the destination mobile terminal according to the identifier of the destination mobile terminal and the parameter information corresponding to the identifier of the destination mobile terminal.

With reference to the fifth aspect, in a possible implementation, the parameter information corresponding to the identifier of the destination mobile terminal is information about a hop count from the destination mobile terminal to the second mobile terminal; or the parameter information corresponding to the identifier of the destination mobile terminal is metric information of a distance between the destination mobile terminal and the second mobile terminal.

With reference to the fifth aspect or the foregoing possible implementation, in another possible implementation, before the receiving, by a first mobile terminal, a first neighbor discovery and setup message sent by a second mobile terminal, the method further includes:

sending, by the first mobile terminal, a second neighbor discovery and setup message to the second mobile terminal, where the second neighbor discovery and setup message carries an identifier of the first mobile terminal.

With reference to the fifth aspect or the foregoing possible implementations, in another possible implementation, before the sending, by the first mobile terminal, a second neighbor discovery and setup message to the second mobile terminal, the method further includes:

receiving, by the first mobile terminal, first indication information sent by a network device, and determining that the first mobile terminal is a mobile terminal having a multi-hop capability, where the first indication information is used by the network device to indicate to the mobile terminal that a communications network in which the network device is located supports communication between mobile terminals having the multi-hop capability, and the mobile terminal having the multi-hop capability is a mobile terminal having a capability of directly communicating with one or more mobile terminals.

With reference to the fifth aspect or the foregoing possible implementations, in another possible implementation, after the receiving, by the first mobile terminal, first indication information sent by a network device, and determining that the first mobile terminal is a mobile terminal having a multi-hop capability, the method further includes:

determining, by the first mobile terminal, that the first mobile terminal has a multi-hop requirement and/or determining that a multi-hop capability switch is in an enabled state.

With reference to the fifth aspect or the foregoing possible implementations, in another possible implementation, after the receiving, by the first mobile terminal, first indication information sent by a network device, and determining that the first mobile terminal is a mobile terminal having a multi-hop capability, the method further includes:

sending, by the first mobile terminal, related information to the network device or sending second indication information to the network device, where the related information is used by the first mobile terminal to apply to the network device for a multi-hop resource and/or is used by the first mobile terminal to indicate that the first mobile terminal has the multi-hop requirement, and the second indication information is used by the first mobile terminal to indicate to the network device that the first mobile terminal is the mobile terminal having the multi-hop capability; and receiving, by the first mobile terminal, resource information sent by the network device, where the resource information includes information about a resource that is allocated by the network device to the first mobile terminal and that is required for sending the second neighbor discovery and setup message; and the sending, by the first mobile terminal, a second neighbor discovery and setup message to the second mobile terminal includes:

sending, by the first mobile terminal, the second neighbor discovery and setup message to the second mobile terminal by using the resource corresponding to the resource information.

With reference to the fifth aspect or the foregoing possible implementations, in another possible implementation, after the receiving, by the first mobile terminal, first indication information sent by a network device, and determining that the first mobile terminal is a mobile terminal having a multi-hop capability, the method further includes:

obtaining, by the first mobile terminal, resource information, where a resource corresponding to the resource information is preallocated by the network device to the first mobile terminal according to a quantity of all mobile terminals having the multi-hop capability in a current cell, and the resource information includes information about the resource that is allocated by the network device to the first mobile terminal and that is required for sending the second neighbor discovery and setup message; and the sending, by the first mobile terminal, a second neighbor discovery and setup message to the second mobile terminal includes:

sending, by the first mobile terminal, the second neighbor discovery and setup message to the second mobile terminal by using the resource corresponding to the resource information.

With reference to the fifth aspect or the foregoing possible implementations, in another possible implementation, before the obtaining, by the first mobile terminal, resource information, the method further includes:

sending, by the first mobile terminal, second indication information to the network device, where the second indication information is used by the first mobile terminal to indicate to the network device that the first mobile terminal is the mobile terminal having the multi-hop capability.

A sixth aspect of the embodiments of the application provides a route setup method, including:

receiving, by a first mobile terminal, a first neighbor discovery and setup message sent by a second mobile terminal, where the first neighbor discovery and setup message carries an identifier of each mobile terminal in a mobile terminal set and signal quality information, of the mobile terminal, corresponding to the identifier of the mobile terminal, and the mobile terminal set includes the second mobile terminal and/or a mobile terminal that is directly or indirectly adjacent to the second mobile terminal; and setting up, by the first mobile terminal, a relay route from the first mobile terminal to a network device according to the signal quality information, of each mobile terminal, corresponding to the identifier of the mobile terminal in the mobile terminal set and signal quality information of the first mobile terminal.

With reference to the sixth aspect, in a possible implementation, the method further includes:

sending, by the first mobile terminal, a second neighbor discovery and setup message to the second mobile terminal, where the second neighbor discovery and setup message carries an identifier of the first mobile terminal and the signal quality information, of the first mobile terminal, corresponding to the identifier of the first mobile terminal, and is used by a mobile terminal other than the first mobile terminal to set up a relay route to the network device.

A seventh aspect of the embodiments of the application provides a network device, including:

a sending unit, configured to send first indication information to a mobile terminal, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

With reference to the seventh aspect, in a possible implementation, the sending unit is specifically configured to:

send a system message to the mobile terminal, where the system message carries the first indication information, and the system message includes at least one of the following: a master information block MIB or a system information block SIB; or send a dedicated radio resource control RRC message to the mobile terminal, where the dedicated RRC message carries the first indication information; or send a management frame to the mobile terminal, where the management frame carries the first indication information; or send a management message to the mobile terminal, where the management message carries the first indication information.

With reference to the seventh aspect or the foregoing possible implementation, in another possible implementation, the network device further includes:

a receiving unit, configured to receive second indication information sent by the mobile terminal, where the second indication information is used by the mobile terminal to indicate to the network device that the mobile terminal is the mobile terminal having the multi-hop capability.

With reference to the seventh aspect or the foregoing possible implementations, in another possible implementation, the receiving unit is further configured to: after the sending unit sends the first indication information to the mobile terminal, receive first related information sent by the mobile terminal, where the first related information is used by the mobile terminal to apply to the network device for a multi-hop resource and/or is used by the mobile terminal to indicate that the mobile terminal has a multi-hop requirement.

With reference to the seventh aspect or the foregoing possible implementations, in another possible implementation, the receiving unit is further configured to: after the sending unit sends the first indication information to the mobile terminal, receive second related information sent by the mobile terminal, where the second related information is used by the mobile terminal to apply to the network device for release of a multi-hop resource and/or is used by the mobile terminal to indicate that the mobile terminal has no multi-hop requirement.

An eighth aspect of the embodiments of the application provides a mobile terminal, including:

a receiving unit, configured to receive first indication information sent by a network device, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

With reference to the eighth aspect, in a possible implementation, the mobile terminal further includes:

a sending unit, configured to send second indication information to the network device, where the second indication information is used by the mobile terminal to indicate to the network device that the mobile terminal is the mobile terminal having the multi-hop capability.

With reference to the eighth aspect or the foregoing possible implementation, in another possible implementation, the sending unit is specifically configured to:

send the second indication information to the network device by using a dedicated radio resource control RRC message.

With reference to the eighth aspect or the foregoing possible implementations, in another possible implementation, the sending unit is further configured to: after the receiving unit receives the first indication information sent by the network device, send first related information to the network device, where the first related information is used by the mobile terminal to apply to the network device for a multi-hop resource and/or is used by the mobile terminal to indicate that the mobile terminal has a multi-hop requirement.

With reference to the eighth aspect or the foregoing possible implementations, in another possible implementation, the sending unit is specifically configured to:

send the first related information to the network device by using a dedicated RRC message.

With reference to the eighth aspect or the foregoing possible implementations, in another possible implementation, the mobile terminal further includes:

a determining unit, configured to: before the sending unit sends the first related information to the network device, determine that the mobile terminal has the multi-hop requirement and/or determine that a multi-hop capability switch is in an enabled state.

With reference to the eighth aspect or the foregoing possible implementations, in another possible implementation, the determining unit is further configured to determine that the mobile terminal has no multi-hop requirement and/or determine that the multi-hop capability switch is in a disabled state; and the sending unit is further configured to send second related information to the network device, where the second related information is used by the mobile terminal to apply to the network device for release of a multi-hop resource and/or is used by the mobile terminal to indicate that the mobile terminal has no multi-hop requirement.

A ninth aspect of the embodiments of the application provides a mobile terminal, including:

a sending unit, configured to send second indication information to a network device, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

With reference to the ninth aspect, in a possible implementation, the sending unit is specifically configured to:

send the second indication information to the network device by using a dedicated radio resource control RRC message.

With reference to the ninth aspect or the foregoing possible implementation, in another possible implementation, the mobile terminal further includes:

a receiving unit, configured to receive first indication information sent by the network device, where the first indication information is used by the network device to indicate to the mobile terminal that a communications network in which the network device is located supports communication between mobile terminals having the multi-hop capability.

With reference to the ninth aspect or the foregoing possible implementations, in another possible implementation, the sending unit is further configured to: after sending the second indication information to the network device, send first related information to the network device, where the first related information is used by the mobile terminal to apply to the network device for a multi-hop resource and/or is used by the mobile terminal to indicate that the mobile terminal has a multi-hop requirement.

With reference to the ninth aspect or the foregoing possible implementations, in another possible implementation, the sending unit is specifically configured to:

send the first related information to the network device by using a dedicated RRC message.

With reference to the ninth aspect or the foregoing possible implementations, in another possible implementation, the mobile terminal further includes:

a determining unit, configured to: before the sending unit sends the first related information to the network device, determine that the mobile terminal has the multi-hop requirement and/or determine that a multi-hop capability switch is in an enabled state.

With reference to the ninth aspect or the foregoing possible implementations, in another possible implementation, the determining unit is further configured to determine that the mobile terminal has no multi-hop requirement and/or determine that the multi-hop capability switch is in a disabled state; and the sending unit is further configured to send second related information to the network device, where the second related information is used by the mobile terminal to apply to the network device for release of a multi-hop resource and/or is used by the mobile terminal to indicate that the mobile terminal has no multi-hop requirement.

A tenth aspect of the embodiments of the application provides a network device, including:

a receiving unit, configured to receive second indication information sent by a mobile terminal, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

With reference to the tenth aspect, in a possible implementation, the network device further includes:

a sending unit, configured to send first indication information to the mobile terminal, where the first indication information is used by the network device to indicate to the mobile terminal that a communications network in which the network device is located supports communication between mobile terminals having the multi-hop capability.

With reference to the tenth aspect or the foregoing possible implementation, in another possible implementation, the sending unit is specifically configured to:

send a system message to the mobile terminal, where the system message carries the first indication information, and the system message includes at least one of the following: a master information block MIB or a system information block SIB; or send a dedicated radio resource control RRC message to the mobile terminal, where the dedicated RRC message carries the first indication information; or send a management frame to the mobile terminal, where the management frame carries the first indication information; or send a management message to the mobile terminal, where the management message carries the first indication information.

With reference to the tenth aspect or the foregoing possible implementations, in another possible implementation, the receiving unit is further configured to: after receiving the second indication information sent by the mobile terminal, receive first related information sent by the mobile terminal, where the first related information is used by the mobile terminal to apply to the network device for a multi-hop resource and/or is used by the mobile terminal to indicate that the mobile terminal has a multi-hop requirement.

With reference to the tenth aspect or the foregoing possible implementations, in another possible implementation, the receiving unit is further configured to: after receiving the second indication information sent by the mobile terminal, receive second related information sent by the mobile terminal, where the second related information is used by the mobile terminal to apply to the network device for release of a multi-hop resource and/or is used by the mobile terminal to indicate that the mobile terminal has no multi-hop requirement.

An eleventh aspect of the embodiments of the application provides a first mobile terminal, including:

a receiving unit, configured to receive a first neighbor discovery and setup message sent by a second mobile terminal, where the first neighbor discovery and setup message carries an identifier of a destination mobile terminal and parameter information corresponding to the identifier of the destination mobile terminal, the second mobile terminal is a mobile terminal that is directly adjacent to the first mobile terminal, and the destination mobile terminal is a mobile terminal that is directly or indirectly adjacent to the second mobile terminal; and a setup unit, configured to set up a route to the destination mobile terminal according to the identifier of the destination mobile terminal and the parameter information corresponding to the identifier of the destination mobile terminal that are received by the receiving unit.

With reference to the eleventh aspect, in a possible implementation, the parameter information corresponding to the identifier of the destination mobile terminal is information about a hop count from the destination mobile terminal to the second mobile terminal; or the parameter information corresponding to the identifier of the destination mobile terminal is metric information of a distance between the destination mobile terminal and the second mobile terminal.

With reference to the eleventh aspect or the foregoing possible implementation, in another possible implementation, the first mobile terminal further includes:

a sending unit, configured to: before the receiving unit receives the first neighbor discovery and setup message sent by the second mobile terminal, send a second neighbor discovery and setup message to the second mobile terminal, where the second neighbor discovery and setup message carries an identifier of the first mobile terminal.

With reference to the eleventh aspect or the foregoing possible implementations, in another possible implementation, the receiving unit is further configured to: before the sending unit sends the second neighbor discovery and setup message to the second mobile terminal, receive first indication information sent by a network device; and the first mobile terminal further includes:

a determining unit, configured to determine that the first mobile terminal is a mobile terminal having a multi-hop capability, where the first indication information is used by the network device to indicate to the mobile terminal that a communications network in which the network device is located supports communication between mobile terminals having the multi-hop capability, and the mobile terminal having the multi-hop capability is a mobile terminal having a capability of directly communicating with one or more mobile terminals.

With reference to the eleventh aspect or the foregoing possible implementations, in another possible implementation, the determining unit is further configured to: after the receiving unit receives the first indication information sent by the network device and the determining unit determines that the first mobile terminal is the mobile terminal having the multi-hop capability, determine that the first mobile terminal has a multi-hop requirement and/or determine that a multi-hop capability switch is in an enabled state.

With reference to the eleventh aspect or the foregoing possible implementations, in another possible implementation, the sending unit is further configured to: after the receiving unit receives the first indication information sent by the network device and the determining unit determines that the first mobile terminal is the mobile terminal having the multi-hop capability, send related information to the network device or send second indication information to the network device, where the related information is used by the first mobile terminal to apply to the network device for a multi-hop resource and/or is used by the first mobile terminal to indicate that the first mobile terminal has the multi-hop requirement, and the second indication information is used by the first mobile terminal to indicate to the network device that the first mobile terminal is the mobile terminal having the multi-hop capability;

the receiving unit is further configured to receive resource information sent by the network device, where the resource information includes information about a resource that is allocated by the network device to the first mobile terminal and that is required for sending the second neighbor discovery and setup message; and the sending unit is specifically configured to:

send the second neighbor discovery and setup message to the second mobile terminal by using the resource corresponding to the resource information received by the receiving unit.

With reference to the eleventh aspect or the foregoing possible implementations, in another possible implementation, the first mobile terminal further includes:

an obtaining unit, configured to obtain resource information after the receiving unit receives the first indication information sent by the network device and the determining unit determines that the first mobile terminal is the mobile terminal having the multi-hop capability, where a resource corresponding to the resource information is preallocated by the network device to the first mobile terminal according to a quantity of all mobile terminals having the multi-hop capability in a current cell, and the resource information includes information about the resource that is allocated by the network device to the first mobile terminal and that is required for sending the second neighbor discovery and setup message; and the sending unit is specifically configured to:

send the second neighbor discovery and setup message to the second mobile terminal by using the resource corresponding to the resource information obtained by the obtaining unit.

With reference to the eleventh aspect or the foregoing possible implementations, in another possible implementation, the sending unit is further configured to send second indication information to the network device before the obtaining unit obtains the resource information, where the second indication information is used by the first mobile terminal to indicate to the network device that the first mobile terminal is the mobile terminal having the multi-hop capability.

A twelfth aspect of the embodiments of the application provides a first mobile terminal, including:

a receiving unit, configured to receive a first neighbor discovery and setup message sent by a second mobile terminal, where the first neighbor discovery and setup message carries an identifier of each mobile terminal in a mobile terminal set and signal quality information, of the mobile terminal, corresponding to the identifier of the mobile terminal, and the mobile terminal set includes the second mobile terminal and/or a mobile terminal that is directly or indirectly adjacent to the second mobile terminal; and a setup unit, configured to set up a relay route from the first mobile terminal to a network device according to the signal quality information of each mobile terminal that is received by the receiving unit and that is corresponding to the identifier of the mobile terminal in the mobile terminal set and signal quality information of the first mobile terminal.

With reference to the twelfth aspect, in a possible implementation, the first mobile terminal further includes:

a sending unit, configured to send a second neighbor discovery and setup message to the second mobile terminal, where the second neighbor discovery and setup message carries an identifier of the first mobile terminal and the signal quality information, of the first mobile terminal, corresponding to the identifier of the first mobile terminal, and is used by a mobile terminal other than the first mobile terminal to set up a relay route to the network device.

According to the capability indication method, the mobile terminal, and the network device that are provided in the embodiments of the application, the network device sends, to the mobile terminal, the first indication information that is used to indicate that the communications network in which the network device is located supports communication between the mobile terminals having the multi-hop capability, so that the mobile terminal can perform a multi-hop-related operation with knowledge that the cell in which the mobile terminal is currently located supports multi-hop. This prevents the mobile terminal from performing an invalid multi-hop-related operation. Therefore, electricity of the mobile terminal is saved in the D2D mesh network. According to the route setup method and the mobile terminal that are provided in the embodiments of the application, the first mobile terminal receives the first neighbor discovery and setup message that is sent by the second mobile terminal and that carries the identifier of the destination mobile terminal and the parameter information corresponding to the identifier of the destination mobile terminal, so as to set up the route to the destination mobile terminal according to the identifier of the destination mobile terminal and the parameter information corresponding to the identifier of the destination mobile terminal. In this way, when the first mobile terminal needs to communicate with the destination mobile terminal that is not directly adjacent to the first mobile terminal, the first mobile terminal can not only implement communication with the non-adjacent mobile terminal by using the route set up between the first mobile terminal and the destination mobile terminal, but also implement one-to-one communication by using the route set up between the first mobile terminal and the destination mobile terminal. Therefore, network overheads are reduced, and security of a data packet transmitted between the mobile terminals is ensured. In addition, because the neighbor discovery and setup message directly carries information required for setting up the route, route setup time and overheads are reduced, and an additional route setup process can be avoided. In this way, route setup complexity is reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a flowchart of a capability indication method according to an embodiment of the present disclosure;

FIG. 2 is a flowchart of a capability indication method according to another embodiment of the present disclosure;

FIG. 3 is a flowchart of a capability indication method according to another embodiment of the present disclosure;

FIG. 4 is a flowchart of a capability indication method according to another embodiment of the present disclosure;

FIG. 5 is a flowchart of a route setup method according to another embodiment of the present disclosure;

FIG. 6 is a flowchart of a route setup method according to another embodiment of the present disclosure;

FIG. 7 is a schematic composition diagram of a network device according to another embodiment of the present disclosure;

DESCRIPTION OF EMBODIMENTS

Figure 8:
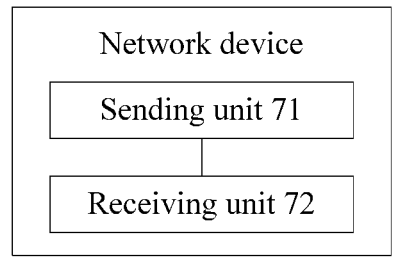
FIG. 8 is a schematic composition diagram of another network device according to another embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the embodiments of the application.

A technology described in this specification may be applied to various communications systems, such as current 2G and 3G communications systems and a next-generation communications system, for example, a Global System for Mobile Communications (GSM) system, a Code Division Multiple Access (CDMA) system, a Time Division Multiple Access (TDMA) system, a Wideband Code Division Multiple Access (WCDMA) system, a Frequency Division Multiple Access (FDMA) system, an orthogonal frequency division multiple access (OFDMA) system, a single carrier FDMA (SC-FDMA) system, a general packet radio service (GPRS) system, a Long Term. Evolution (LTE) system, and other communications systems of this type.

In this specification, various aspects are described with reference to a terminal and/or a base station and/or a base station node.

The user equipment may be a wireless terminal, or may be a wired terminal. The wireless terminal may be a device that provides voice and/or data connectivity for a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) or a computer with a mobile terminal, for example, may be a portable mobile apparatus, a pocket-sized mobile apparatus, a handheld mobile apparatus, a computer built-in mobile apparatus, or an in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, or user equipment.

The base station (for example, an access point) may be a device communicating with a wireless terminal on an air interface by using one or more sectors in an access network. The base station may be configured to perform mutual conversion between a received over-the-air frame and an IP packet, and serve as a router between the wireless terminal and another part of the access network. Another part of the access network may include an Internet Protocol (IP) network. The base station may further coordinate air interface attribute management. For example, the base station may be a base station (Base Transceiver Station, BTS) in GSM or CDMA, may be a base station (NodeB) in WCDMA, or may be an evolved NodeB (evolved NodeB, eNB, or eNodeB) in LTE. This is not limited in this application.

In addition, the terms "system" and "network" in this specification are usually used interchangeably in this specification. The term "and/or" in this specification is merely an associative relationship for describing associated objects, and indicates that three relationships may exist. For example, A and/or B may indicate the following three cases: A alone exists, both A and B exist, and B alone exists. In addition, the character "/" in this specification generally indicates that there is an "or" relationship between former and latter associated objects.

An embodiment of the present disclosure provides a capability indication method. As shown in FIG. 1, the method may include the following step:

101: A network device sends first indication information to a mobile terminal, where the first indication information is used by the network device to indicate to the mobile terminal that a communications network in which the network device is located supports communication between mobile terminals having a multi-hop capability.

The mobile terminal having the multi-hop capability is a mobile terminal having a capability of directly communicating with one or more mobile terminals.

The "directly communicating" means that forwarding by the network device is not needed for the mobile terminals to implement data transmission between the mobile terminals. The "one or more mobile terminals" may be adjacent to the mobile terminal having the multi-hop capability, or may not be adjacent to the mobile terminal having the multi-hop capability.

To prevent the mobile terminal from performing an invalid multi-hop-related operation, when the network device determines that the communications network in which the network device is located supports communication between the mobile terminals having the multi-hop capability, the network device may send, to the mobile terminal, the first indication information that is used to indicate that the communications network in which the network device is located supports communication between the mobile terminals having the multi-hop capability, so that the mobile terminal can know that a cell in which the mobile terminal is currently located supports multi-hop, and therefore can perform a multi-hop-related operation with knowledge that the cell in which the mobile terminal is currently located supports multi-hop.

It should be noted that the capability indication method described in this embodiment of the present disclosure may be applied to a wireless communications system, such as LTE system, Wi-Fi system, Worldwide Interoperability for Microwave Access (WIMAX) system, or a cellular system related to the 3rd Generation Partnership Project (3GPP). This is not specifically limited in this embodiment of the present disclosure.

It should be noted that the mobile terminal in this embodiment of the present disclosure may be UE or another communications device.

According to the capability indication method provided in this embodiment of the present disclosure, the network device sends, to the mobile terminal, the first indication information that is used to indicate that the communications network in which the network device is located supports communication between the mobile terminals having the multi-hop capability, so that the mobile terminal can perform a multi-hop-related operation with knowledge that the cell in which the mobile terminal is currently located supports multi-hop. This prevents the mobile terminal from performing an invalid multi-hop-related operation. Therefore, electricity of the mobile terminal is saved in a D2D mesh network.

In this embodiment of the present disclosure, further, the network device may send the first indication information to the mobile terminal in multiple different manners. That is, step 101 may specifically include the following:

The network device sends a system message to the mobile terminal, where the system message carries the first indication information, and the system message may include at least one of the following: a master information block (MIB) or a system information block (SIB).

It should be noted that, in this embodiment of the present disclosure, the system message is described by using merely examples. In actual application, the system message may include but is not limited to at least one of the MIB or the SIB.

Alternatively, the network device sends a dedicated radio resource control (RRC) message to the mobile terminal, where the dedicated RRC message carries the first indication information.

Alternatively, the network device sends a management frame to the mobile terminal, where the management frame carries the first indication information.

Alternatively, the network device sends a management message to the mobile terminal, where the management message carries the first indication information.

When the network device sends the first indication information to the mobile terminal by using the system message, the first indication information may be an information element that is newly added to the system message, or may be an information element that already exists in the existing system message. Certainly, the first indication information may be indicated in another form alternatively. This is not specifically limited in this embodiment of the present disclosure. However, when the first indication information is the information element that already exists in the existing system message, the information element that already exists needs to have multiple values.

For example, assuming that the system message is the SIB, the first indication information may be an information element that is newly added to the SIB.

Alternatively, the first indication information may be an information element SIB18 that already exists in the SIB in an existing protocol. The existing protocol stipulates that: If the SIB includes the information element SIB18, it indicates that a network side supports D2D broadcast communication. In this case, it may be stipulated that: If the SIB includes the information element SIB18, and the SIB18 is "1", representing the first indication information, it indicates that the communications network in which the network device is located supports communication between the mobile terminals having the multi-hop capability; if the SIB includes the information element SIB18, and the SIB18 is "0", it indicates that the network side supports D2D broadcast communication.

Alternatively, the first indication information may be an information element SIB19 that already exists in the SIB in an existing protocol. The existing protocol stipulates that: If the SIB includes the information element SIB19, it indicates that a network side supports D2D discovery. In this case, it may be stipulated that: If the SIB includes the information element SIB19, and the SIB19 is "1", representing the first indication information, it indicates that the communications network in which the network device is located supports communication between the mobile terminals having the multi-hop capability; if the SIB includes the information element SIB19, and the SIB19 is "0", it indicates that the network side supports D2D discovery.

It should be noted that the foregoing describes only examples of the system message used to send the first indication information to the mobile terminal by the network device, and is not to limit a specific representation form of the system message.

Similarly, when the network device sends the first indication information to the mobile terminal by using the dedicated RRC message, the management frame, or the management message, the first indication information may be an information element that is newly added to the dedicated RRC message, the management frame, or the management message, or may be an information element that already exists in the existing dedicated RRC message, management frame, or management message. Certainly, the first indication information may be indicated in another form alternatively. This is also not specifically limited in this embodiment of the present disclosure.

It should be noted that, when the network device sends the first indication information to the mobile terminal by using the system message or the dedicated RRC message, the network device may be an access network side device such as a base station, or may be a core network side device such as a mobility management entity (MME). This is not specifically limited in this embodiment of the present disclosure. Certainly, when the network device is the MME, the MME may send the first indication information to the mobile terminal by means of forwarding by a base station. When the network device sends the first indication information to the mobile terminal by using the management frame, the network device may be an access point (AP). When the network device sends the first indication information to the mobile terminal by using the management message, the network device may be a base station (BS).

In this embodiment of the present disclosure, further, the capability indication method may further include: receiving, by the network device, second indication information sent by the mobile terminal, where the second indication information is used by the mobile terminal to indicate to the network device that the mobile terminal is the mobile terminal having the multi-hop capability.

Further, the receiving, by the network device, second indication information sent by the mobile terminal may be specifically: receiving, by the network device, the second indication information sent by the mobile terminal by using a dedicated RRC message. For example, when the network device receives the second indication information sent by the mobile terminal by using the dedicated RRC message, the dedicated RRC message may be specifically UE capability information.

It should be noted that, in this embodiment of the present disclosure, step 101 and the receiving, by the network device, second indication information sent by the mobile terminal are performed in no particular order. That is, step 101 may be performed first, and then, an operation of the receiving, by the network device, second indication information sent by the mobile terminal is performed. Alternatively, an operation of the receiving, by the network device, second indication information sent by the mobile terminal is performed first, and then, step 101 is performed. Certainly, alternatively, step 101 and an operation of the receiving, by the network device, second indication information sent by the mobile terminal may be simultaneously performed. A performing sequence of step 101 and the receiving, by the network device, second indication information sent by the mobile terminal is not specifically limited in this embodiment of the present disclosure.

When the operation of the receiving, by the network device, second indication information sent by the mobile terminal is performed first, and then step 101 is performed, the network device may send, during a process of performing step 101, the first indication information to only the mobile terminal having the multi-hop capability, that is, the mobile terminal sending the second indication information. This can save network resources.

In this embodiment of the present disclosure, further, after step 101, the capability indication method may further include: receiving, by the network device, first related information sent by the mobile terminal, where the first related information is used by the mobile terminal to apply to the network device for a multi-hop resource and/or is used by the mobile terminal to indicate that the mobile terminal has a multi-hop requirement.

It should be noted that, in this embodiment of the present disclosure, the "the mobile terminal has a multi-hop requirement" mainly means that "the mobile terminal is interested in multi-hop".

Further, the receiving, by the network device, first related information sent by the mobile terminal may be specifically: receiving, by the network device, the first related information sent by the mobile terminal by using a dedicated RRC message. For example, when the network device receives the first related information sent by the mobile terminal by using the dedicated RRC message, the dedicated RRC message may be specifically a D2D link information message (Sidelink UE Information message).

In this embodiment of the present disclosure, further, after step 101, the capability indication method may further include: receiving, by the network device, second related information sent by the mobile terminal, where the second related information is used by the mobile terminal to apply to the network device for release of a multi-hop resource and/or is used by the mobile terminal to indicate that the mobile terminal has no multi-hop requirement.

It should be noted that, in this embodiment of the present disclosure, the "the mobile terminal has no multi-hop requirement" mainly means that "the mobile terminal is no longer interested in multi-hop".

Further, the receiving, by the network device, second related information sent by the mobile terminal may be specifically: receiving, by the network device, the second related information sent by the mobile terminal by using a dedicated RRC message. For example, when the network device receives the second related information sent by the mobile terminal by using the dedicated RRC message, the dedicated RRC message may be specifically a sidelink UE information message.

Another embodiment of the present disclosure provides a capability indication method. As shown in FIG. 2, the method may include the following step:

201: A mobile terminal receives first indication information sent by a network device, where the first indication information is used by the network device to indicate to the mobile terminal that a communications network in which the network device is located supports communication between mobile terminals having a multi-hop capability.

The mobile terminal having the multi-hop capability is a mobile terminal having a capability of directly communicating with one or more mobile terminals.

To prevent the mobile terminal from performing an invalid multi-hop-related operation, when the network device determines that the communications network in which the network device is located supports communication between the mobile terminals having the multi-hop capability, the network device may send, to the mobile terminal, the first indication information that is used to indicate that the communications network in which the network device is located supports communication between the mobile terminals having the multi-hop capability. In this case, the mobile terminal can receive the first indication information sent by the network device. In this way, the mobile terminal can know, according to the first indication information, that a cell in which the mobile terminal is currently located supports multi-hop, and therefore can perform a multi-hop-related operation with knowledge that the cell in which the mobile terminal is currently located supports multi-hop.

It should be noted that, in different wireless communications systems, the network device may use different manners to send, to the mobile terminal, the first indication information that is used to indicate that the communications network in which the network device is located supports communication between the mobile terminals having the multi-hop capability. A manner used by the network device to send the indication information is not specifically limited in this embodiment of the present disclosure. For example, in LTE, the network device may send the first indication information to the mobile terminal by using a system message. Alternatively, the network device may send the first indication information to the mobile terminal by using a dedicated RRC message. In Wi-Fi, the network device may send the first indication information to the mobile terminal by using a management frame. In WIMAX, the network device may send the first indication information to the mobile terminal by using a management message.

In this case, specifically, in LTE, when receiving the system message, the mobile terminal may first determine whether the system message carries the first indication information. If determining that the system message carries the first indication information, the mobile terminal can know that the cell in which the mobile terminal is currently located supports multi-hop. Then, the mobile terminal may perform the multi-hop-related operation, for example, triggering a peer discovery process. Alternatively, the mobile terminal indicates, to the network device, a D2D-related interest indication of the mobile terminal. For example, the mobile terminal indicates to the network device that the mobile terminal has a multi-hop requirement (that is, indicates to the network device that the mobile terminal is interested in multi-hop). If determining that the system message does not carry the first indication information and determining that the mobile terminal currently has a multi-hop requirement, the mobile terminal may trigger a cell reselection process or trigger a cell selection process, so as to reselect, as far as possible, a cell supporting multi-hop.

Similarly, when the network device sends the first indication information to the mobile terminal by using the dedicated RRC message, the management frame, or the management message, an operation performed by the mobile terminal is similar to an operation performed by the mobile terminal when the network device sends the first indication information to the mobile terminal by using the system message. Details are not described herein again in this embodiment of the present disclosure.

It should be noted that the capability indication method described in this embodiment of the present disclosure may be applied to a wireless communications system, such as LTE system, Wi-Fi system, WIMAX system, or a cellular system related to the 3GPP. This is not specifically limited in this embodiment of the present disclosure.

According to the capability indication method provided in this embodiment of the present disclosure, the mobile terminal receives the first indication information that is sent by the network device and that is used to indicate that the communications network in which the network device is located supports communication between the mobile terminals having the multi-hop capability, so as to learn that the cell in which the mobile terminal is currently located supports multi-hop. Then, the mobile terminal can perform the multi-hop-related operation with knowledge that the cell in which the mobile terminal is currently located supports multi-hop. This prevents the mobile terminal from performing an invalid multi-hop-related operation. Therefore, electricity of the mobile terminal is saved in a D2D mesh network.

In this embodiment of the present disclosure, further, the capability indication method may further include: sending, by the mobile terminal, second indication information to the network device, where the second indication information is used by the mobile terminal to indicate to the network device that the mobile terminal is the mobile terminal having the multi-hop capability.

It should be noted that, in this embodiment of the present disclosure, step 201 and the sending, by the mobile terminal, second indication information to the network device are performed in no particular order. That is, step 201 may be performed first, and then, an operation of the sending, by the mobile terminal, second indication information to the network device is performed. Alternatively, an operation of the sending, by the mobile terminal, second indication information to the network device is performed first, and then, step 201 is performed. Certainly, alternatively, step 201 and an operation of the sending, by the mobile terminal, second indication information to the network device may be simultaneously performed. A performing sequence of step 201 and the sending, by the mobile terminal, second indication information to the network device is not specifically limited in this embodiment of the present disclosure.

In this embodiment of the present disclosure, further, the sending, by the mobile terminal, second indication information to the network device may specifically include: sending, by the mobile terminal, the second indication information to the network device by using a dedicated RRC message. For example, when the mobile terminal sends the second indication information to the network device by using the dedicated RRC message, the dedicated RRC message may be specifically UE capability information.

When the mobile terminal sends the second indication information to the network device by using the dedicated RRC message, the second indication information may be an information element that is newly added to the dedicated RRC message, or may be an information element that already exists in the existing dedicated RRC message. Certainly, the second indication information may be indicated in another form alternatively. This is not specifically limited in this embodiment of the present disclosure. However, when the second indication information is the information element that already exists in the existing dedicated RRC message, the information element that already exists needs to have multiple values.

For example, assuming that the dedicated RRC message is the UE capability information, the second indication information may be an information element that is newly added to the UE capability information.

Alternatively, the second indication information may be an information element that already exists in the UE capability information in an existing protocol and that is used to indicate that the mobile terminal supports a band for communication, that is, communication supported bands-r12. In this case, it may be stipulated that: If the communication supported bands-r12 included in the UE capability information is "1", representing the second indication information, it indicates that the mobile terminal is the mobile terminal having the multi-hop capability; if the communication supported bands-r12 included in the UE capability information is "0", it indicates that the mobile terminal supports the band for communication.

Alternatively, the second indication information may be an information element that already exists in the UE capability information in an existing protocol and that is used to indicate that the mobile terminal supports simultaneous implementation of D2D communication and a network-side service, that is, communication simultaneous Tx-r12. In this case, it may be stipulated that: If the communication simultaneous Tx-r12 included in the UE capability information is "1", representing the second indication information, it indicates that the mobile terminal is the mobile terminal having the multi-hop capability; if the communication simultaneous Tx-r12 included in the UE capability information is "0", it indicates that the mobile terminal supports simultaneous implementation of D2D communication and the network-side service.

It should be noted that the foregoing describes only examples of the dedicated RRC message used to send the second indication information to the network device by the mobile terminal, and is not to limit a specific representation form of the dedicated RRC message.

In this embodiment of the present disclosure, further, after step 201, the capability indication method may further include: sending, by the mobile terminal, first related information to the network device, where the first related information is used by the mobile terminal to apply to the network device for a multi-hop resource and/or is used by the mobile terminal to indicate that the mobile terminal has a multi-hop requirement.

In this embodiment of the present disclosure, further, the sending, by the mobile terminal, first related information to the network device may specifically include: sending, by the mobile terminal, the first related information to the network device by using a dedicated RRC message. For example, when the mobile terminal sends the first related information to the network device by using the dedicated RRC message, the dedicated RRC message may be specifically a sidelink UE information message.

In this embodiment of the present disclosure, further, before the sending, by the mobile terminal, first related information to the network device, the capability indication method may further include: determining, by the mobile terminal, that the mobile terminal has the multi-hop requirement and/or determining that a multi-hop capability switch is in an enabled state.

It should be noted that, in this embodiment of the present disclosure, the "the mobile terminal has the multi-hop requirement" mainly means that "the mobile terminal is interested in multi-hop".

In this embodiment of the present disclosure, further, the capability indication method may further include: determining, by the mobile terminal, that the mobile terminal has no multi-hop requirement and/or determining that the multi-hop capability switch is in a disabled state; and sending, by the mobile terminal, second related information to the network device, where the second related information is used by the mobile terminal to apply to the network device for release of a multi-hop resource and/or is used by the mobile terminal to indicate that the mobile terminal has no multi-hop requirement.

It should be noted that, in this embodiment of the present disclosure, the "the mobile terminal has no multi-hop requirement" mainly means that "the mobile terminal is no longer interested in multi-hop".

Further, the sending, by the mobile terminal, second related information to the network device may specifically include: sending, by the mobile terminal, the second related information to the network device by using a dedicated RRC message. For example, when the mobile terminal sends the second related information to the network device by using the dedicated RRC message, the dedicated RRC message may be specifically a sidelink UE information message.

Another embodiment of the present disclosure provides a capability indication method. As shown in FIG. 3, the method may include the following step:

301: A mobile terminal sends second indication information to a network device, where the second indication information is used by the mobile terminal to indicate to the network device that the mobile terminal is a mobile terminal having a multi-hop capability.

The mobile terminal having the multi-hop capability is a mobile terminal having a capability of directly communicating with one or more mobile terminals.

When determining that the mobile terminal is the mobile terminal having the multi-hop capability, the mobile terminal may send, to the network device, the second indication information that is used to indicate that the mobile terminal is the mobile terminal having the multi-hop capability, so that the network device can know that the mobile terminal supports multi-hop, and therefore can perform a multi-hop-related operation with knowledge that the mobile terminal supports multi-hop. For example, when the network device knows that the mobile terminal supports multi-hop, when performing mode selection, the network device considers selecting a multi-hop mode for the mobile terminal; alternatively, when performing resource allocation, the network device considers a quantity of all mobile terminals having the multi-hop capability in a current cell.

It should be noted that the capability indication method described in this embodiment of the present disclosure may be applied to a wireless communications system, such as LTE system, Wi-Fi system, WIMAX system, or a cellular system related to the 3GPP. This is not specifically limited in this embodiment of the present disclosure.

According to the capability indication method provided in this embodiment of the present disclosure, the mobile terminal sends, to the network device, the second indication information that is used to indicate that the mobile terminal is the mobile terminal having the multi-hop capability, so that the network device can perform the multi-hop-related operation with knowledge that the mobile terminal supports multi-hop. This prevents the network device from performing an invalid multi-hop-related operation. Therefore, system performance is improved.

In this embodiment of the present disclosure, further, step 301 may specifically include: sending, by the mobile terminal, the second indication information to the network device by using a dedicated RRC message. For example, when the mobile terminal sends the second indication information to the network device by using the dedicated RRC message, the dedicated RRC message may be specifically UE capability information.

When the mobile terminal sends the second indication information to the network device by using the dedicated RRC message, the second indication information may be an information element that is newly added to the dedicated RRC message, or may be an information element that already exists in the existing dedicated RRC message. Certainly, the second indication information may be indicated in another form alternatively. This is not specifically limited in this embodiment of the present disclosure. However, when the second indication information is the information element that already exists in the existing dedicated RRC message, the information element that already exists needs to have multiple values.

In this embodiment of the present disclosure, further, the capability indication method may further include: receiving, by the mobile terminal, first indication information sent by the network device, where the first indication information is used by the network device to indicate to the mobile terminal that a communications network in which the network device is located supports communication between mobile terminals having the multi-hop capability.

In different wireless communications systems, the network device may use different manners to send, to the mobile terminal, the first indication information that is used to indicate that the communications network in which the network device is located supports communication between the mobile terminals having the multi-hop capability. A manner used by the network device to send the indication information is not specifically limited in this embodiment of the present disclosure.

It should be noted that, in this embodiment of the present disclosure, step 301 and the receiving, by the mobile terminal, first indication information sent by the network device are performed in no particular order. That is, step 301 may be performed first, and then, an operation of the receiving, by the mobile terminal, first indication information sent by the network device is performed. Alternatively, an operation of the receiving, by the mobile terminal, first indication information sent by the network device is performed first, and then, step 301 is performed. Certainly, alternatively, step 301 and an operation of the receiving, by the mobile terminal, first indication information sent by the network device may be simultaneously performed. A performing sequence of step 301 and the receiving, by the mobile terminal, first indication information sent by the network device is not specifically limited in this embodiment of the present disclosure.

In this embodiment of the present disclosure, further, after step 301, the capability indication method may further include: sending, by the mobile terminal, first related information to the network device, where the first related information is used by the mobile terminal to apply to the network device for a multi-hop resource and/or is used by the mobile terminal to indicate that the mobile terminal has a multi-hop requirement.

In this embodiment of the present disclosure, further, the sending, by the mobile terminal, first related information to the network device may specifically include: sending, by the mobile terminal, the first related information to the network device by using a dedicated RRC message. For example, when the mobile terminal sends the first related information to the network device by using the dedicated RRC message, the dedicated RRC message may be specifically a sidelink UE information message.

In this embodiment of the present disclosure, further, before the sending, by the mobile terminal, first related information to the network device, the capability indication method may further include: determining, by the mobile terminal, that the mobile terminal has the multi-hop requirement and/or determining that a multi-hop capability switch is in an enabled state.

It should be noted that, in this embodiment of the present disclosure, the "the mobile terminal has the multi-hop requirement" mainly means that "the mobile terminal is interested in multi-hop".

In this embodiment of the present disclosure, further, the capability indication method may further include: determining, by the mobile terminal, that the mobile terminal has no multi-hop requirement and/or determining that the multi-hop capability switch is in a disabled state; and sending, by the mobile terminal, second related information to the network device, where the second related information is used by the mobile terminal to apply to the network device for release of a multi-hop resource and/or is used by the mobile terminal to indicate that the mobile terminal has no multi-hop requirement.

It should be noted that, in this embodiment of the present disclosure, the "the mobile terminal has no multi-hop requirement" mainly means that "the mobile terminal is no longer interested in multi-hop".

Further, the sending, by the mobile terminal, second related information to the network device may specifically include: sending, by the mobile terminal, the second related information to the network device by using a dedicated RRC message. For example, when the mobile terminal sends the second related information to the network device by using the dedicated RRC message, the dedicated RRC message may be specifically a sidelink UE information message.

Another embodiment of the present disclosure provides a capability indication method. As shown in FIG. 4, the method may include the following steps.

401: A network device receives second indication information sent by a mobile terminal, where the second indication information is used by the mobile terminal to indicate to the network device that the mobile terminal is a mobile terminal having a multi-hop capability.

The mobile terminal having the multi-hop capability is a mobile terminal having a capability of directly communicating with one or more mobile terminals.

Further, the network device may receive second indication information sent by the mobile terminal by using a dedicated RRC message.

When determining that the mobile terminal is the mobile terminal having the multi-hop capability, the mobile terminal may send, to the network device, the second indication information that is used to indicate that the mobile terminal is the mobile terminal having the multi-hop capability. In this case, the network device can receive the second indication information sent by the mobile terminal. In this way, the network device can know, according to the second indication information, that the mobile terminal supports multi-hop, and therefore can perform a multi-hop-related operation with knowledge that the mobile terminal supports multi-hop.

It should be noted that the capability indication method described in this embodiment of the present disclosure may be applied to a wireless communications system, such as LTE system, Wi-Fi system, WIMAX system, or a cellular system related to the 3GPP. This is not specifically limited in this embodiment of the present disclosure.

According to the capability indication method provided in this embodiment of the present disclosure, the network device receives the second indication information that is sent by the mobile terminal and that is used to indicate that the mobile terminal is the mobile terminal having the multi-hop capability, so as to learn that the mobile terminal supports multi-hop. Then, the network device can perform the multi-hop-related operation with knowledge that the mobile terminal supports multi-hop. This prevents the network device from performing an invalid multi-hop-related operation. Therefore, system performance is improved.

In this embodiment of the present disclosure, further, the capability indication method may further include: sending, by the network device, first indication information to the mobile terminal, where the first indication information is used by the network device to indicate to the mobile terminal that a communications network in which the network device is located supports communication between mobile terminals having the multi-hop capability.

It should be noted that, in this embodiment of the present disclosure, step 401 and the sending, by the network device, first indication information to the mobile terminal are performed in no particular order. That is, step 401 may be performed first, and then, an operation of the sending, by the network device, first indication information to the mobile terminal is performed. Alternatively, an operation of the sending, by the network device, first indication information to the mobile terminal is performed first, and then, step 401 is performed. Certainly, alternatively, step 401 and an operation of the sending, by the network device, first indication information to the mobile terminal may be simultaneously performed. A performing sequence of step 401 and the sending, by the network device, first indication information to the mobile terminal is not specifically limited in this embodiment of the present disclosure.

When step 401 is performed first, and then the operation of the sending, by the network device, first indication information to the mobile terminal is performed, the network device may send, during a process of sending the first indication information to the mobile terminal, the first indication information to only the mobile terminal having the multi-hop capability, that is, the mobile terminal sending the second indication information. This can save network resources.

In this embodiment of the present disclosure, further, the network device may send the first indication information to the mobile terminal in multiple different manners. That is, the sending, by the network device, first indication information to the mobile terminal may specifically include the following:

The network device sends a system message to the mobile terminal, where the system message carries the first indication information, and the system message may include at least one of the following: an MIB or an SIB.

It should be noted that, in this embodiment of the present disclosure, the system message is described by using merely examples. In actual application, the system message may include but is not limited to at least one of the MIB or the SIB.

Alternatively, the network device sends a dedicated RRC message to the mobile terminal, where the dedicated RRC message carries the first indication information.

Alternatively, the network device sends a management frame to the mobile terminal, where the management frame carries the first indication information.

Alternatively, the network device sends a management message to the mobile terminal, where the management message carries the first indication information.

When the network device sends the first indication information to the mobile terminal by using the system message, the first indication information may be an information element that is newly added to the system message, or may be an information element that already exists in the existing system message. Certainly, the first indication information may be indicated in another form alternatively. This is not specifically limited in this embodiment of the present disclosure. However, when the first indication information is the information element that already exists in the existing system message, the information element that already exists needs to have multiple values. Similarly, when the network device sends the first indication information to the mobile terminal by using the dedicated RRC message, the management frame, or the management message, the first indication information may be an information element that is newly added to the dedicated RRC message, the management frame, or the management message, or may be an information element that already exists in the existing dedicated RRC message, management frame, or management message. Certainly, the first indication information may be indicated in another form alternatively. This is also not specifically limited in this embodiment of the present disclosure.

It should be noted that, when the network device sends the first indication information to the mobile terminal by using the system message or the dedicated RRC message, the network device may be an access network side device such as a base station, or may be a core network side device such as an MME. This is not specifically limited in this embodiment of the present disclosure. Certainly, when the network device is the MME, the MME may send the first indication information to the mobile terminal by means of forwarding by a base station. When the network device sends the first indication information to the mobile terminal by using the management frame, the network device may be an AP. When the network device sends the first indication information to the mobile terminal by using the management message, the network device may be a BS.

In this embodiment of the present disclosure, further, after step 401, the capability indication method may further include: receiving, by the network device, first related information sent by the mobile terminal, where the first related information is used by the mobile terminal to apply to the network device for a multi-hop resource and/or is used by the mobile terminal to indicate that the mobile terminal has a multi-hop requirement.

It should be noted that, in this embodiment of the present disclosure, the "the mobile terminal has a multi-hop requirement" mainly means that "the mobile terminal is interested in multi-hop".

Further, the receiving, by the network device, first related information sent by the mobile terminal may be specifically: receiving, by the network device, the first related information sent by the mobile terminal by using a dedicated RRC message. For example, when the network device receives the first related information sent by the mobile terminal by using the dedicated RRC message, the dedicated RRC message may be specifically a sidelink UE information message.

In this embodiment of the present disclosure, further, after step 401, the capability indication method may further include: receiving, by the network device, second related information sent by the mobile terminal, where the second related information is used by the mobile terminal to apply to the network device for release of a multi-hop resource and/or is used by the mobile terminal to indicate that the mobile terminal has no multi-hop requirement.

It should be noted that, in this embodiment of the present disclosure, the "the mobile terminal has no multi-hop requirement" mainly means that "the mobile terminal is no longer interested in multi-hop".

Further, the receiving, by the network device, second related information sent by the mobile terminal may specifically include: receiving, by the network device, the second related information sent by the mobile terminal by using a dedicated RRC message. For example, when the network device receives the second related information sent by the mobile terminal by using the dedicated RRC message, the dedicated RRC message may be specifically a sidelink UE information message.

It is widely known that, when mobile terminals communicate with each other by using a D2D technology, only a single-hop transmission mode and a broadcast or multicast mode can be used. Specifically, for example, in a scenario in which the mobile terminals communicate with each other by using the single-hop transmission mode and the broadcast mode, when a mobile terminal 1 has a data packet that needs to be sent, the mobile terminal 1 may broadcast the data packet that needs to be sent. In this way, at least one mobile terminal 2 adjacent to the mobile terminal 1 can receive the data packet that is broadcast by the mobile terminal 1. In addition, after receiving the data packet, the mobile terminal 2 does not continue to forward the data packet. It can be learned that at least the following problems exist when the mobile terminals communicate with each other by using the D2D technology: A first problem is that using the single-hop transmission mode cannot implement communication between mobile terminals that are not adjacent. A second problem is that a data packet transmitted between the mobile terminals is broadcast over an entire network when communication between the mobile terminals is implemented by using the broadcast or multicast mode; therefore, when one-to-one communication needs to be performed between the mobile terminals, if the broadcast or multicast mode is still used, relatively high network overheads are caused, and security of a data packet transmitted between the mobile terminals cannot be ensured. The foregoing problems can be well resolved by using a route setup method provided in the embodiments of the application. In addition, for ease of understanding by a person skilled in the art, in the embodiments of the application, specific implementation processes of technical solutions provided in the embodiments of the application are described by using the following embodiments.

Another embodiment of the present disclosure provides a route setup method. As shown in FIG. 5, the method may include the following steps.

501: A first mobile terminal receives a first neighbor discovery and setup message sent by a second mobile terminal, where the first neighbor discovery and setup message carries an identifier of a destination mobile terminal and parameter information corresponding to the identifier of the destination mobile terminal.

The second mobile terminal is a mobile terminal that is directly adjacent to the first mobile terminal, and the destination mobile terminal is a mobile terminal that is directly or indirectly adjacent to the second mobile terminal. It may be said that the destination mobile terminal is a mobile terminal that is not directly adjacent to the first mobile terminal. For example, if a mobile terminal directly adjacent to the second mobile terminal is a third mobile terminal, then a fourth mobile terminal directly adjacent to the third mobile terminal may be referred to as a mobile terminal that is indirectly adjacent to the second mobile terminal. Further, a fifth mobile terminal directly adjacent to the fourth mobile terminal may be referred to as a mobile terminal that is indirectly adjacent to the second mobile terminal. The rest may be deduced by analogy.

502: The first mobile terminal sets up a route to the destination mobile terminal according to the identifier of the destination mobile terminal and the parameter information corresponding to the identifier of the destination mobile terminal.

To implement communication between mobile terminals that are not adjacent, and to avoid a problem that relatively high network overheads are caused and security of a data packet transmitted between mobile terminals cannot be ensured if a broadcast or multicast mode is still used when one-to-one communication needs to be performed between the mobile terminals, before one-to-one communication is performed between the mobile terminals, a route between the mobile terminals may be set up in advance. Specifically, when the second mobile terminal sends the first neighbor discovery and setup message to the first mobile terminal, the first neighbor discovery and setup message needs to carry the identifier of the destination mobile terminal and the parameter information corresponding to the identifier of the destination mobile terminal. In this way, when receiving the first neighbor discovery and setup message sent by the second mobile terminal, the first mobile terminal can set up the route to the destination mobile terminal directly according to the identifier of the destination mobile terminal and the parameter information corresponding to the identifier of destination mobile terminal that are carried in the first neighbor discovery and setup message, so as to perform, when needing to perform one-to-one communication with the destination mobile terminal, communication directly according to the route that is set up.

According to the route setup method provided in this embodiment of the present disclosure, the first mobile terminal receives the first neighbor discovery and setup message that is sent by the second mobile terminal and that carries the identifier of the destination mobile terminal and the parameter information corresponding to the identifier of the destination mobile terminal, so as to set up the route to the destination mobile terminal according to the identifier of the destination mobile terminal and the parameter information corresponding to the identifier of the destination mobile terminal. In this way, when the first mobile terminal needs to communicate with the destination mobile terminal that is not directly adjacent to the first mobile terminal, the first mobile terminal can not only implement communication with the non-adjacent mobile terminal by using the route set up between the first mobile terminal and the destination mobile terminal, but also implement one-to-one communication by using the route set up between the first mobile terminal and the destination mobile terminal. Therefore, network overheads are reduced, and security of a data packet transmitted between the mobile terminals is ensured. In addition, because the neighbor discovery and setup message directly carries information required for setting up the route, route setup time and overheads are reduced, and an additional route setup process can be avoided. In this way, route setup complexity is reduced.

In this embodiment of the present disclosure, further, the parameter information corresponding to the identifier of the destination mobile terminal is information about a hop count from the destination mobile terminal to the second mobile terminal, or the parameter information corresponding to the identifier of the destination mobile terminal is metric information of a distance between the destination mobile terminal and the second mobile terminal.

In this embodiment of the present disclosure, further, before step 501, the route setup method may further include: sending, by the first mobile terminal, a second neighbor discovery and setup message to the second mobile terminal, where the second neighbor discovery and setup message carries an identifier of the first mobile terminal.

In this embodiment of the present disclosure, further, only when a network device and the first mobile terminal have a multi-hop capability, the first mobile terminal can communicate with a mobile terminal that is not directly adjacent to the first mobile terminal; therefore, to prevent the first mobile terminal from performing an invalid route setup operation, before the sending, by the first mobile terminal, a second neighbor discovery and setup message to the second mobile terminal, the route setup method may further include: receiving, by the first mobile terminal, first indication information sent by the network device, and determining that the first mobile terminal is a mobile terminal having the multi-hop capability, where the first indication information is used by the network device to indicate to the mobile terminal that a communications network in which the network device is located supports communication between mobile terminals having the multi-hop capability, and the mobile terminal having the multi-hop capability is a mobile terminal having a capability of directly communicating with one or more mobile terminals.

In this embodiment of the present disclosure, further, after the receiving, by the first mobile terminal, first indication information sent by the network device, and determining that the first mobile terminal is a mobile terminal having the multi-hop capability, the route setup method may further include: determining, by the first mobile terminal, that the first mobile terminal has a multi-hop requirement and/or determining that a multi-hop capability switch is in an enabled state.

In this embodiment of the present disclosure, further, after the receiving, by the first mobile terminal, first indication information sent by the network device, and determining that the first mobile terminal is a mobile terminal having the multi-hop capability, the route setup method may further include:

sending, by the first mobile terminal, related information to the network device or sending second indication information to the network device, where the related information is used by the first mobile terminal to apply to the network device for a multi-hop resource and/or is used by the first mobile terminal to indicate that the first mobile terminal has the multi-hop requirement, and the second indication information is used by the first mobile terminal to indicate to the network device that the first mobile terminal is the mobile terminal having the multi-hop capability; and receiving, by the first mobile terminal, resource information sent by the network device, where the resource information includes information about a resource that is allocated by the network device to the first mobile terminal and that is required for sending the second neighbor discovery and setup message.

The sending, by the first mobile terminal, a second neighbor discovery and setup message to the second mobile terminal may specifically include: sending, by the first mobile terminal, the second neighbor discovery and setup message to the second mobile terminal by using the resource corresponding to the resource information.

It should be noted that, in this embodiment of the present disclosure, the "the mobile terminal has a multi-hop requirement" mainly means that "the mobile terminal is interested in multi-hop".

In this embodiment of the present disclosure, further, after the receiving, by the first mobile terminal, first indication information sent by the network device, and determining that the first mobile terminal is a mobile terminal having the multi-hop capability, the route setup method may further include:

obtaining, by the first mobile terminal, resource information, where a resource corresponding to the resource information is preallocated by the network device to the first mobile terminal according to a quantity of all mobile terminals having the multi-hop capability in a current cell, and the resource information includes information about the resource that is allocated by the network device to the first mobile terminal and that is required for sending the second neighbor discovery and setup message.

The sending, by the first mobile terminal, a second neighbor discovery and setup message to the second mobile terminal may specifically include: sending, by the first mobile terminal, the second neighbor discovery and setup message to the second mobile terminal by using the resource corresponding to the resource information.

In this embodiment of the present disclosure, further, before the obtaining, by the first mobile terminal, resource information, the route setup method may further include: sending, by the first mobile terminal, second indication information to the network device, where the second indication information is used by the first mobile terminal to indicate to the network device that the first mobile terminal is the mobile terminal having the multi-hop capability.

For example, for ease of understanding by a person skilled in the art, in the embodiments of the application, the route setup method provided in the embodiments of the application is described herein by using an example. It is assumed that there are three mobile terminals in a cell. The mobile terminals are a mobile terminal 1, a mobile terminal 2, and a mobile terminal 3, respectively. In addition, for example, parameter information corresponding to an identifier of a destination mobile terminal is information about a hop count from the destination mobile terminal to a second mobile terminal. The mobile terminal 1 is directly adjacent to the mobile terminal 2, and the mobile terminal 2 is directly adjacent to the mobile terminal 3. It is assumed that the mobile terminal 1 is a device triggering a route setup process. In this case, a process of setting up a route between the mobile terminals in the cell is specifically as follows.

Step 1: The mobile terminal 1 sends a first neighbor discovery and setup message in a broadcast manner. Because the mobile terminal 1 triggers the route setup process, at this moment, the mobile terminal 1 does not know information about any mobile terminal adjacent to the mobile terminal 1. Therefore, the first neighbor discovery and setup message sent by the mobile terminal 1 by means of broadcast needs to carry only an identifier of the mobile terminal 1.

Step 2: The mobile terminal 2 receives the first neighbor discovery and setup message sent by the mobile terminal 1, and sets up a route to the mobile terminal 1, that is, the mobile terminal 2→the mobile terminal 1, according to the identifier of the mobile terminal 1 carried in the first neighbor discovery and setup message.

Step 3: The mobile terminal 2 sends a second neighbor discovery and setup message in a broadcast manner. In addition, because the mobile terminal 2 already knows information about the mobile terminal 1 at this moment, the second neighbor discovery and setup message sent by the mobile terminal 2 by means of broadcast carries an identifier of the mobile terminal 2, the identifier of the mobile terminal 1, and information that is corresponding to the identifier of the mobile terminal 1 and that is about a hop count from the mobile terminal 1 to the mobile terminal 2 (because the mobile terminal 1 and the mobile terminal 2 are directly adjacent, the hop count information is 1 in this case).

Step 4: Because the mobile terminal 1 and the mobile terminal 3 are both adjacent to the mobile terminal 2, in this case, each of the mobile terminal 1 and the mobile terminal 3 can receive the second neighbor discovery and setup message sent by the mobile terminal 2.

Step 5: The mobile terminal 1 may set up a route to the mobile terminal 2, that is, the mobile terminal 1→the mobile terminal 2, according to the identifier of the mobile terminal 2 carried in the second neighbor discovery and setup message, and may ignore the identifier of the mobile terminal 1 and the hop count information corresponding to the identifier that are carried in the second neighbor discovery and setup message.

Step 6: The mobile terminal 3 may set up a route to the mobile terminal 2, that is, the mobile terminal 3→the mobile terminal 2, according to the identifier of the mobile terminal 2 carried in the second neighbor discovery and setup message, and may set up a route from the mobile terminal 3 to the mobile terminal 1, that is, the mobile terminal 3→the mobile terminal 2→the mobile terminal 1, according to the identifier of the mobile terminal 1 and the mobile-terminal-1-to-mobile-terminal-2 hop count information corresponding to the identifier of the mobile terminal 1 that are carried in the second neighbor discovery and setup message.

Step 7: The mobile terminal 3 sends a third neighbor discovery and setup message in a broadcast manner. In addition, because the mobile terminal 3 already knows information about the mobile terminal 1 and information about the mobile terminal 2 at this moment, the third neighbor discovery and setup message sent by the mobile terminal 3 by means of broadcast carries an identifier of the mobile terminal 3, the identifier of the mobile terminal 2, information that is corresponding to the identifier of the mobile terminal 2 and that is about a hop count from the mobile terminal 3 to the mobile terminal 2 (because the mobile terminal 2 and the mobile terminal 3 are directly adjacent, the hop count information is 1 in this case), the identifier of the mobile terminal 1, and information that is corresponding to the identifier of the mobile terminal 1 and that is about a hop count from the mobile terminal 1 to the mobile terminal 3 (because the mobile terminal 1 is indirectly adjacent to the mobile terminal 3, with the mobile terminal 2 being between the mobile terminal 1 and the mobile terminal 3, the hop count information in this case is 2).

Step 8: The mobile terminal 2 may receive the third neighbor discovery and setup message sent by the mobile terminal 3, and may set up a route to the mobile terminal 3, that is, the mobile terminal 2→the mobile terminal 3, according to the identifier of the mobile terminal 3 carried in the third neighbor discovery and setup message; further, the mobile terminal 2 may further compare the mobile-terminal-2-to-mobile-terminal-1 route set up according to the identifier of the mobile terminal 1 and the mobile-terminal-1-to-mobile-terminal-3 hop count information corresponding to the identifier of the mobile terminal 1 that are carried in the third neighbor discovery and setup message with the mobile-terminal-2-to-mobile-terminal-1 route set up according to the identifier of the mobile terminal 1 carried in the first neighbor discovery and setup message, and select an optimal route for reservation.

Step 9: At this moment, the mobile terminal 2 may further continue to send a new neighbor discovery and setup message, where the new neighbor discovery and setup message carries the information about the mobile terminal 1 and the information about the mobile terminal 3. Specifically, the new neighbor discovery and setup message sent by the mobile terminal 2 by means of broadcast carries the identifier of the mobile terminal 2, the identifier of the mobile terminal 1, information that is corresponding to the identifier of the mobile terminal 1 and that is about a hop count from the mobile terminal 2 to the mobile terminal 1 (because the mobile terminal 2 and the mobile terminal 1 are directly adjacent, the hop count information is 1 in this case), the identifier of the mobile terminal 3, and information that is corresponding to the identifier of the mobile terminal 3 and that is about a hop count from the mobile terminal 3 to the mobile terminal 2 (because the mobile terminal 3 and the mobile terminal 2 are directly adjacent, the hop count information is also 1 in this case).

Step 10: Because the mobile terminal 1 and the mobile terminal 3 are both adjacent to the mobile terminal 2, in this case, each of the mobile terminal 1 and the mobile terminal 3 can receive the new neighbor discovery and setup message sent by the mobile terminal 2.

Step 11: The mobile terminal 1 may set up a route to the mobile terminal 3, that is, the mobile terminal 1→the mobile terminal 2→the mobile terminal 3, according to the identifier of the mobile terminal 3 and the mobile-terminal-3-to-mobile-terminal-2 hop count information corresponding to the identifier of the mobile terminal 3 that are carried in the new neighbor discovery and setup message, and may obtain the information about the mobile terminal 2 to update related information according to the information. Similarly, when receiving the new neighbor discovery and setup message from the mobile terminal 2, the mobile terminal 3 obtains the information about the mobile terminal 2 to update related information according to the information, and meanwhile, the mobile terminal 3 also obtains the information about the mobile terminal 1 to update related information according to the information.

The routes between the mobile terminal 1, the mobile terminal 2, and the mobile terminal 3 can be set up by means of the foregoing steps.

Another embodiment of the present disclosure provides a route setup method. As shown in FIG. 6, the method may include the following steps.

601: A first mobile terminal receives a first neighbor discovery and setup message sent by a second mobile terminal, where the first neighbor discovery and setup message carries an identifier of each mobile terminal in a mobile terminal set and signal quality information, of the mobile terminal, corresponding to the identifier of the mobile terminal.

The mobile terminal set includes the second mobile terminal and/or a mobile terminal that is directly or indirectly adjacent to the second mobile terminal. For example, the signal quality information may be downlink reference signal received power (RSRP) or a channel quality indicator (CQI).

602: The first mobile terminal sets up a relay route from the first mobile terminal to a network device according to the signal quality information, of each mobile terminal, corresponding to the identifier of the mobile terminal in the mobile terminal set and signal quality information of the first mobile terminal.

For example, the first mobile terminal may select, according to the signal quality information, of each mobile terminal, corresponding to the identifier of the mobile terminal in the mobile terminal set and the signal quality information of the first mobile terminal, a mobile terminal with best signal quality information as a relay node of the first mobile terminal, to set up the relay route from the first mobile terminal to the network device.

It should be noted that the first mobile terminal may select, according to the signal quality information, of each mobile terminal, corresponding to the identifier of the mobile terminal in the mobile terminal set and the signal quality information of the first mobile terminal, a mobile terminal that meets a relay route setup condition, as a relay node of the first mobile terminal. In this embodiment of the present disclosure, the relay route setup condition is not specifically limited herein, and may be set according to a requirement of an actual application scenario.

According to the route setup method provided in this embodiment of the present disclosure, the first mobile terminal receives the first neighbor discovery and setup message that is sent by the second mobile terminal and that carries the identifier of each mobile terminal in the mobile terminal set and the signal quality information, of the mobile terminal, corresponding to the identifier of the mobile terminal, so as to set up the relay route from the first mobile terminal to the network device according to the signal quality information, of each mobile terminal, corresponding to the identifier of the mobile terminal in the mobile terminal set and the signal quality information of the first mobile terminal. Because the neighbor discovery and setup message directly carries information required for setting up the relay route, route setup time and overheads are reduced, and an additional route setup process can be avoided. In this way, route setup complexity is reduced.

In this embodiment of the present disclosure, further, the route setup method may further include: sending, by the first mobile terminal, a second neighbor discovery and setup message to the second mobile terminal, where the second neighbor discovery and setup message carries an identifier of the first mobile terminal and the signal quality information, of the first mobile terminal, corresponding to the identifier of the first mobile terminal, and is used by a mobile terminal other than the first mobile terminal to set up a relay route to the network device.

For example, for ease of understanding by a person skilled in the art, in the embodiments of the application, the route setup method provided in the embodiments of the application is described herein by using an example. It is assumed that there are three mobile terminals in a cell. The mobile terminals are a mobile terminal 1, a mobile terminal 2, and a mobile terminal 3, respectively. The mobile terminal 1 is directly adjacent to the mobile terminal 2, and the mobile terminal 2 is directly adjacent to the mobile terminal 3. It is assumed that the mobile terminal 1 is a device triggering a route setup process. In this case, a process of setting up a route between the mobile terminals in the cell is specifically as follows.

Step 1: The mobile terminal 1 sends a first neighbor discovery and setup message in a broadcast manner. Because the mobile terminal 1 triggers the route setup process, at this moment, the mobile terminal 1 does not know signal quality information of any mobile terminal that is directly or indirectly adjacent to the mobile terminal 1. Therefore, the first neighbor discovery and setup message sent by the mobile terminal 1 by means of broadcast carries only an identifier of the mobile terminal 1 and signal quality information, of the mobile terminal 1, corresponding to the identifier of the mobile terminal 1.

Step 2: The mobile terminal 2 receives the first neighbor discovery and setup message sent by the mobile terminal 1, and compares the signal quality information of the mobile terminal 1 carried in the first neighbor discovery and setup message with signal quality information of the mobile terminal 2, and if the signal quality information of the mobile terminal 1 is better than the signal quality information of the mobile terminal 2, the mobile terminal 2 selects the mobile terminal 1 as a relay node of the mobile terminal 2, and sets up a relay route from the mobile terminal 2 to a network device by using the mobile terminal 1 as the relay node.

Step 3: The mobile terminal 2 sends a second neighbor discovery and setup message in a broadcast manner. In addition, because the mobile terminal 2 already knows the signal quality information of the mobile terminal 1 at this moment, the second neighbor discovery and setup message sent by the mobile terminal 2 by means of broadcast carries an identifier of the mobile terminal 2, the signal quality information, of the mobile terminal 2, corresponding to the identifier of the mobile terminal 2, the identifier of the mobile terminal 1, and the signal quality information, of the mobile terminal 1, corresponding to the identifier of the mobile terminal 1.

Step 4: Because the mobile terminal 1 and the mobile terminal 3 are both adjacent to the mobile terminal 2, in this case, each of the mobile terminal 1 and the mobile terminal 3 can receive the second neighbor discovery and setup message sent by the mobile terminal 2.

Step 5: The mobile terminal 1 may compare the signal quality information of the mobile terminal 2 carried in the second neighbor discovery and setup message with the signal quality information of the mobile terminal 1 (the mobile terminal 1 ignores the signal quality information of the mobile terminal 1 carried in the second neighbor discovery and setup message), and if the signal quality information of the mobile terminal 2 is quite poor, the mobile terminal 1 does not select the mobile terminal 2 as a relay node of the mobile terminal 1. Similarly, the mobile terminal 3 may also compare the signal quality information of the mobile terminal 2 and the signal quality information of the mobile terminal 1 that are carried in the second neighbor discovery and setup message with signal quality information of the mobile terminal 3, and if the signal quality information of the mobile terminal 1 is optimal, the mobile terminal 3 selects the mobile terminal 1 as a relay node of the mobile terminal 3, and sets up a relay route from the mobile terminal 3 to the network device by using the mobile terminal 1 as the relay node.

Step 6: The mobile terminal 3 sends a third neighbor discovery and setup message in a broadcast manner. In addition, because the mobile terminal 3 already knows the signal quality information of the mobile terminal 1 and the signal quality information of the mobile terminal 2 at this moment, the third neighbor discovery and setup message sent by the mobile terminal 3 by means of broadcast carries an identifier of the mobile terminal 3, the signal quality information, of the mobile terminal 3, corresponding to the identifier of the mobile terminal 3, the identifier of the mobile terminal 2, the signal quality information, of the mobile terminal 2, corresponding to the identifier of the mobile terminal 2, the identifier of the mobile terminal 1, and the signal quality information, of the mobile terminal 1, corresponding to the identifier of the mobile terminal 1.

Step 7: The mobile terminal 2 may receive the third neighbor discovery and setup message sent by the mobile terminal 3, and compare the signal quality information of the mobile terminal 1 and the signal quality information of the mobile terminal 3 that are carried in the third neighbor discovery and setup message with the signal quality information of the mobile terminal 2 (the mobile terminal 2 ignores the signal quality information of the mobile terminal 2 carried in the third neighbor discovery and setup message), and if the signal quality information of the mobile terminal 3 is optimal, the mobile terminal 2 selects the mobile terminal 3 as a relay node of the mobile terminal 2, and sets up a relay route from the mobile terminal 2 to the network device by using the mobile terminal 3 as the relay node, and the relay route for which the mobile terminal 1 is used as the relay node in step 2 is not required.

The relay route from each of the mobile terminal 1, the mobile terminal 2, and the mobile terminal 3 to the network device can be set up by means of the foregoing steps.

Another embodiment of the present disclosure provides a network device. As shown in FIG. 7, the network device may include a sending unit 71.

The sending unit 71 is configured to send first indication information to a mobile terminal, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

In this embodiment of the present disclosure, further, the sending unit 71 is specifically configured to:

send a system message to the mobile terminal, where the system message carries the first indication information, and the system message includes at least one of the following: a master information block MIB or a system information block SIB, where it should be noted that, in this embodiment of the present disclosure, the system message is described by using merely examples, and in actual application, the system message may include but is not limited to at least one of the MIB or the SIB; or send a dedicated radio resource control RRC message to the mobile terminal, where the dedicated RRC message carries the first indication information; or send a management frame to the mobile terminal, where the management frame carries the first indication information; or send a management message to the mobile terminal, where the management message carries the first indication information.

It should be noted that, when the sending unit 71 is specifically configured to send the system message to the mobile terminal, where the system message carries the first indication information, or when the sending unit 71 is specifically configured to send the dedicated radio resource control RRC message to the mobile terminal, where the dedicated RRC message carries the first indication information, the network device may be an access network side device such as a base station, or may be a core network side device such as an MME. This is not specifically limited in this embodiment of the present disclosure. Certainly, when the network device is the MME, the sending unit 71 included in the MME may send the first indication information to the mobile terminal by means of forwarding by abase station. When the sending unit 71 is specifically configured to send the management frame to the mobile terminal, where the management frame carries the first indication information, the network device may be an AP. When the sending unit 71 is specifically configured to send the management message to the mobile terminal, where the management message carries the first indication information, the network device may be a BS.

In this embodiment of the present disclosure, further, as shown in FIG. 8, the network device may further include a receiving unit 72.

The receiving unit 72 is configured to receive second indication information sent by the mobile terminal, where the second indication information is used by the mobile terminal to indicate to the network device that the mobile terminal is the mobile terminal having the multi-hop capability.

Further, that the receiving unit 72 receives second indication information sent by the mobile terminal may be specifically: the receiving unit 72 receives the second indication information sent by the mobile terminal by using a dedicated RRC message. For example, when the receiving unit 72 receives the second indication information sent by the mobile terminal by using the dedicated RRC message, the dedicated RRC message may be specifically UE capability information.

In this embodiment of the present disclosure, further, the receiving unit 72 is further configured to: after the sending unit 71 sends the first indication information to the mobile terminal, receive first related information sent by the mobile terminal, where the first related information is used by the mobile terminal to apply to the network device for a multi-hop resource and/or is used by the mobile terminal to indicate that the mobile terminal has a multi-hop requirement.

Further, that the receiving unit 72 receives first related information sent by the mobile terminal may be specifically: the receiving unit 72 receives the first related information sent by the mobile terminal by using a dedicated RRC message. For example, when the receiving unit 72 receives the first related information sent by the mobile terminal by using the dedicated RRC message, the dedicated RRC message may be specifically a sidelink UE information message.

In this embodiment of the present disclosure, further, the receiving unit 72 is further configured to: after the sending unit 71 sends the first indication information to the mobile terminal, receive second related information sent by the mobile terminal, where the second related information is used by the mobile terminal to apply to the network device for release of a multi-hop resource and/or is used by the mobile terminal to indicate that the mobile terminal has no multi-hop requirement.

Further, that the receiving unit 72 receives second related information sent by the mobile terminal may be specifically: the receiving unit 72 receives the second related information sent by the mobile terminal by using a dedicated RRC message. For example, when the receiving unit 72 receives the second related information sent by the mobile terminal by using the dedicated RRC message, the dedicated RRC message may be specifically a sidelink UE information message.

It should be noted that the network device described in this embodiment of the present disclosure may be applied to a wireless communications system, such as LTE system, Wi-Fi system, WIMAX system, or a cellular system related to the 3GPP. This is not specifically limited in this embodiment of the present disclosure. In addition, for a specific working process of each function module in the network device provided in this embodiment of the present disclosure, refer to specific descriptions of a corresponding process in the method embodiments. Details are not described again in this embodiment of the present disclosure.

It should be noted that the sending unit 71 in this embodiment may be a transmitter of the network device, and the receiving unit 72 may be a receiver of the network device. Alternatively, the sending unit 71 and the receiving unit 72 may be integrated to constitute a transceiver of the network device.

The network device provided in this embodiment of the present disclosure sends, to the mobile terminal, the first indication information that is used to indicate that the communications network in which the network device is located supports communication between the mobile terminals having the multi-hop capability, so that the mobile terminal can perform a multi-hop-related operation with knowledge that a cell in which the mobile terminal is currently located supports multi-hop. This prevents the mobile terminal from performing an invalid multi-hop-related operation. Therefore, electricity of the mobile terminal is saved in a D2D mesh network.

Figure 9:
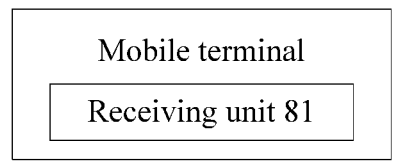
FIG. 9 is a schematic composition diagram of a mobile terminal according to another embodiment of the present disclosure.

Another embodiment of the present disclosure provides a mobile terminal. As shown in FIG. 9, the mobile terminal may include a receiving unit 81.

The receiving unit 81 is configured to receive first indication information sent by a network device, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

Further, the receiving unit 81 may specifically receive the first indication information sent by the network device by using a system message, a dedicated RRC message, a management frame, or a management message.

Figure 10:
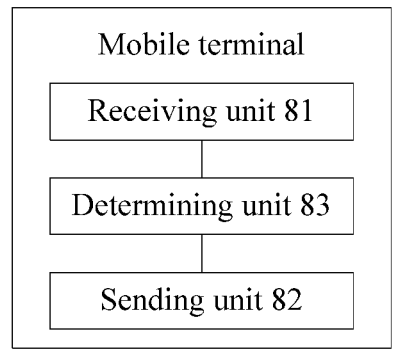
FIG. 10 is a schematic composition diagram of another mobile terminal according to another embodiment of the present disclosure.

In this embodiment of the present disclosure, further, as shown in FIG. 10, the mobile terminal may further include a sending unit 82.

The sending unit 82 is configured to send second indication information to the network device, where the second indication information is used by the mobile terminal to indicate to the network device that the mobile terminal is the mobile terminal having the multi-hop capability.

In this embodiment of the present disclosure, further, the sending unit 82 is specifically configured to send the second indication information to the network device by using a dedicated radio resource control RRC message. For example, when the sending unit 82 is specifically configured to send the second indication information to the network device by using the dedicated RRC message, the dedicated RRC message may be specifically UE capability information.

In this embodiment of the present disclosure, further, the sending unit 82 is further configured to: after the receiving unit 81 receives the first indication information sent by the network device, send first related information to the network device, where the first related information is used by the mobile terminal to apply to the network device for a multi-hop resource and/or is used by the mobile terminal to indicate that the mobile terminal has a multi-hop requirement.

In this embodiment of the present disclosure, further, the sending unit 82 is specifically configured to send the first related information to the network device by using a dedicated RRC message. For example, when the sending unit 82 is specifically configured to send the first related information to the network device by using the dedicated RRC message, the dedicated RRC message may be specifically a sidelink UE information message.

In this embodiment of the present disclosure, further, the mobile terminal may further include a determining unit 83.

The determining unit 83 is configured to: before the sending unit 82 sends the first related information to the network device, determine that the mobile terminal has the multi-hop requirement and/or determine that a multi-hop capability switch is in an enabled state.

In this embodiment of the present disclosure, further, the determining unit 83 is further configured to determine that the mobile terminal has no multi-hop requirement and/or determine that the multi-hop capability switch is in a disabled state.

The sending unit 82 is further configured to send second related information to the network device, where the second related information is used by the mobile terminal to apply to the network device for release of a multi-hop resource and/or is used by the mobile terminal to indicate that the mobile terminal has no multi-hop requirement.

It should be noted that the mobile terminal described in this embodiment of the present disclosure may be applied to a wireless communications system, such as LTE system, Wi-Fi system, WIMAX system, or a cellular system related to the 3GPP. This is not specifically limited in this embodiment of the present disclosure. In addition, for a specific working process of each function module in the mobile terminal provided in this embodiment of the present disclosure, refer to specific descriptions of a corresponding process in the method embodiments. Details are not described again in this embodiment of the present disclosure.

It should be noted that the receiving unit 81 in this embodiment may be a receiver of the mobile terminal, and the sending unit 82 may be a transmitter of the mobile terminal. Alternatively, the receiving unit 81 and the sending unit 82 may be integrated to constitute a transceiver of the mobile terminal. The determining unit 83 may be a separately disposed processor, or may be integrated into a processor of the mobile terminal for implementation. Alternatively, the determining unit 83 may be stored in a memory of the mobile terminal in a form of program code, and a processor of the mobile terminal invokes and performs the foregoing functions of the determining unit 83. The processor herein may be a central processing unit (CPU) or an application-specific integrated circuit (ASIC), or be configured as one or more integrated circuits implementing this embodiment of the present disclosure.

The mobile terminal provided in this embodiment of the present disclosure receives the first indication information that is sent by the network device and that is used to indicate that the communications network in which the network device is located supports communication between the mobile terminals having the multi-hop capability, so as to learn that a cell in which the mobile terminal is currently located supports multi-hop. Then, the mobile terminal can perform a multi-hop-related operation with knowledge that the cell in which the mobile terminal is currently located supports multi-hop. This prevents the mobile terminal from performing an invalid multi-hop-related operation. Therefore, electricity of the mobile terminal is saved in a D2D mesh network.

Figure 11:
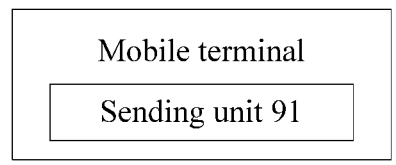
FIG. 11 is a schematic composition diagram of a mobile terminal according to another embodiment of the present disclosure.

Another embodiment of the present disclosure provides a mobile terminal. As shown in FIG. 11, the mobile terminal may include a sending unit 91.

The sending unit 91 is configured to send second indication information to a network device, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

In this embodiment of the present disclosure, further, the sending unit 91 is specifically configured to send the second indication information to the network device by using a dedicated radio resource control RRC message. For example, when the sending unit 91 is specifically configured to send the second indication information to the network device by using the dedicated RRC message, the dedicated RRC message may be specifically UE capability information.

Figure 12:
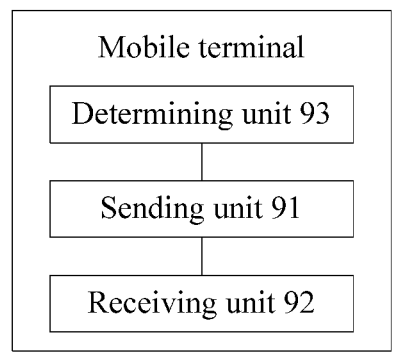
FIG. 12 is a schematic composition diagram of another mobile terminal according to another embodiment of the present disclosure.

In this embodiment of the present disclosure, further, as shown in FIG. 12, the mobile terminal may further include a receiving unit 92.

The receiving unit 92 is configured to receive first indication information sent by the network device, where the first indication information is used by the network device to indicate to the mobile terminal that a communications network in which the network device is located supports communication between mobile terminals having the multi-hop capability.

In different wireless communications systems, the network device may use different manners to send, to the mobile terminal, the first indication information that is used to indicate that the communications network in which the network device is located supports communication between the mobile terminals having the multi-hop capability. A manner used by the network device to send the indication information is not specifically limited in this embodiment of the present disclosure.

In this embodiment of the present disclosure, further, the sending unit 91 is further configured to: after sending the second indication information to the network device, send first related information to the network device, where the first related information is used by the mobile terminal to apply to the network device for a multi-hop resource and/or is used by the mobile terminal to indicate that the mobile terminal has a multi-hop requirement.

In this embodiment of the present disclosure, further, the sending unit 91 is specifically configured to send the first related information to the network device by using a dedicated RRC message. For example, when the sending unit 91 is specifically configured to send the first related information to the network device by using the dedicated RRC message, the dedicated RRC message may be specifically a sidelink UE information message.

In this embodiment of the present disclosure, further, the mobile terminal may further include a determining unit 93.

The determining unit 93 is configured to: before the sending unit 91 sends the first related information to the network device, determine that the mobile terminal has the multi-hop requirement and/or determine that a multi-hop capability switch is in an enabled state.

In this embodiment of the present disclosure, further, the determining unit 93 is further configured to determine that the mobile terminal has no multi-hop requirement and/or determine that the multi-hop capability switch is in a disabled state.

The sending unit 91 is further configured to send second related information to the network device, where the second related information is used by the mobile terminal to apply to the network device for release of a multi-hop resource and/or is used by the mobile terminal to indicate that the mobile terminal has no multi-hop requirement. For example, when the sending unit 91 sends the second related information to the network device by using the dedicated RRC message, the dedicated RRC message may be specifically a sidelink UE information message.

It should be noted that the mobile terminal described in this embodiment of the present disclosure may be applied to a wireless communications system, such as LTE system, Wi-Fi system, WIMAX system, or a cellular system related to the 3GPP. This is not specifically limited in this embodiment of the present disclosure. In addition, for a specific working process of each function module in the mobile terminal provided in this embodiment of the present disclosure, refer to specific descriptions of a corresponding process in the method embodiments. Details are not described again in this embodiment of the present disclosure.

It should be noted that the sending unit 91 in this embodiment may be a transmitter of the mobile terminal, and the receiving unit 92 may be a receiver of the mobile terminal. Alternatively, the sending unit 91 and the receiving unit 92 may be integrated to constitute a transceiver of the mobile terminal. The determining unit 93 may be a separately disposed processor, or may be integrated into a processor of the mobile terminal for implementation. Alternatively, the determining unit 93 may be stored in a memory of the mobile terminal in a form of program code, and a processor of the mobile terminal invokes and performs the foregoing functions of the determining unit 93. The processor herein may be a CPU or an ASIC, or be configured as one or more integrated circuits implementing this embodiment of the present disclosure.

The mobile terminal provided in this embodiment of the present disclosure sends, to the network device, the second indication information that is used to indicate that the mobile terminal is the mobile terminal having the multi-hop capability, so that the network device can perform a multi-hop-related operation with knowledge that the mobile terminal supports multi-hop. This prevents the network device from performing an invalid multi-hop-related operation. Therefore, system performance is improved.

Figure 13:
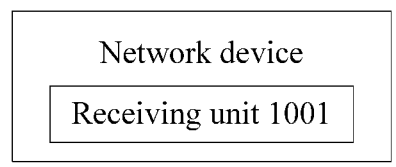
FIG. 13 is a schematic composition diagram of a network device according to another embodiment of the present disclosure.

Another embodiment of the present disclosure provides a network device. As shown in FIG. 13, the network device includes a receiving unit 1001.

The receiving unit 1001 is configured to receive second indication information sent by a mobile terminal, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

Figure 14:
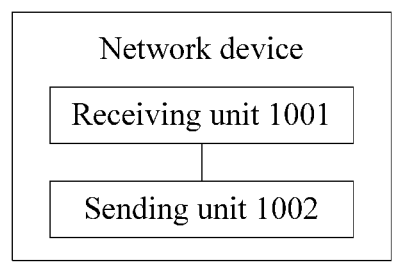
FIG. 14 is a schematic composition diagram of another network device according to another embodiment of the present disclosure.

In this embodiment of the present disclosure, further, as shown in FIG. 14, the network device may further include a sending unit 1002.

The sending unit 1002 is configured to send first indication information to the mobile terminal, where the first indication information is used by the network device to indicate to the mobile terminal that a communications network in which the network device is located supports communication between mobile terminals having the multi-hop capability.

In this embodiment of the present disclosure, further, the sending unit 1002 is specifically configured to:

send a system message to the mobile terminal, where the system message carries the first indication information, and the system message includes at least one of the following: a master information block MIB or a system information block SIB; or send a dedicated radio resource control RRC message to the mobile terminal, where the dedicated RRC message carries the first indication information; or send a management frame to the mobile terminal, where the management frame carries the first indication information; or send a management message to the mobile terminal, where the management message carries the first indication information.

It should be noted that, when the sending unit 1002 is specifically configured to send the system message to the mobile terminal, where the system message carries the first indication information, or when the sending unit 1002 is specifically configured to send the dedicated radio resource control RRC message to the mobile terminal, where the dedicated RRC message carries the first indication information, the network device may be an access network side device such as a base station, or may be a core network side device such as an MME. This is not specifically limited in this embodiment of the present disclosure. Certainly, when the network device is the MME, the sending unit 1002 included in the MME may send the first indication information to the mobile terminal by means of forwarding by a base station. When the sending unit 1002 is specifically configured to send the management frame to the mobile terminal, where the management frame carries the first indication information, the network device may be an AP. When the sending unit 1002 is specifically configured to send the management message to the mobile terminal, where the management message carries the first indication information, the network device may be a BS.

In this embodiment of the present disclosure, further, the receiving unit 1001 is further configured to: after receiving the second indication information sent by the mobile terminal, receive first related information sent by the mobile terminal, where the first related information is used by the mobile terminal to apply to the network device for a multi-hop resource and/or is used by the mobile terminal to indicate that the mobile terminal has a multi-hop requirement.

Further, that the receiving unit 1001 receives first related information sent by the mobile terminal may be specifically: the receiving unit 1001 receives the first related information sent by the mobile terminal by using a dedicated RRC message. For example, when the receiving unit 1001 receives the first related information sent by the mobile terminal by using the dedicated RRC message, the dedicated RRC message may be specifically a sidelink UE information message.

In this embodiment of the present disclosure, further, the receiving unit 1001 is further configured to: after receiving the second indication information sent by the mobile terminal, receive second related information sent by the mobile terminal, where the second related information is used by the mobile terminal to apply to the network device for release of a multi-hop resource and/or is used by the mobile terminal to indicate that the mobile terminal has no multi-hop requirement.

Further, that the receiving unit 1001 receives second related information sent by the mobile terminal may specifically include: the receiving unit 1001 receives the second related information sent by the mobile terminal by using a dedicated RRC message. For example, when the receiving unit 1001 receives the second related information sent by the mobile terminal by using the dedicated RRC message, the dedicated RRC message may be specifically a sidelink UE information message.

It should be noted that the network device described in this embodiment of the present disclosure may be applied to a wireless communications system, such as LTE system, Wi-Fi system, WIMAX system, or a cellular system related to the 3GPP. This is not specifically limited in this embodiment of the present disclosure. In addition, for a specific working process of each function module in the network device provided in this embodiment of the present disclosure, refer to specific descriptions of a corresponding process in the method embodiments. Details are not described again in this embodiment of the present disclosure.

It should be noted that the receiving unit 1001 in this embodiment may be a receiver of the network device, and the sending unit 1002 may be a transmitter of the network device. Alternatively, the receiving unit 1001 and the sending unit 1002 may be integrated to constitute a transceiver of the network device.

The network device provided in this embodiment of the present disclosure receives the second indication information that is sent by the mobile terminal and that is used to indicate that the mobile terminal is the mobile terminal having the multi-hop capability, so as to learn that the mobile terminal supports multi-hop. Then, the network device can perform a multi-hop-related operation with knowledge that the mobile terminal supports multi-hop. This prevents the network device from performing an invalid multi-hop-related operation. Therefore, system performance is improved.

Figure 15:
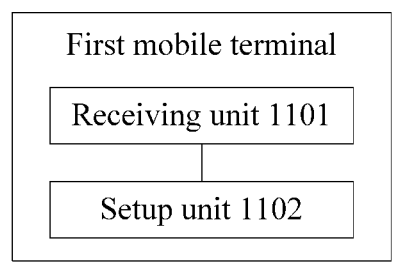
FIG. 15 is a schematic composition diagram of a first mobile terminal according to another embodiment of the present disclosure.

Another embodiment of the present disclosure provides a first mobile terminal. As shown in FIG. 15, the first mobile terminal may include a receiving unit 1101 and a setup unit 1102.

The receiving unit 1101 is configured to receive a first neighbor discovery and setup message sent by a second mobile terminal, where the first neighbor discovery and setup message carries an identifier of a destination mobile terminal and parameter information corresponding to the identifier of the destination mobile terminal, the second mobile terminal is a mobile terminal that is directly adjacent to the first mobile terminal, and the destination mobile terminal is a mobile terminal that is directly or indirectly adjacent to the second mobile terminal.

The setup unit 1102 is configured to set up a route to the destination mobile terminal according to the identifier of the destination mobile terminal and the parameter information corresponding to the identifier of the destination mobile terminal that are received by the receiving unit 1101.

In this embodiment of the present disclosure, further, the parameter information corresponding to the identifier of the destination mobile terminal is information about a hop count from the destination mobile terminal to the second mobile terminal, or the parameter information corresponding to the identifier of the destination mobile terminal is metric information of a distance between the destination mobile terminal and the second mobile terminal.

Figure 16:
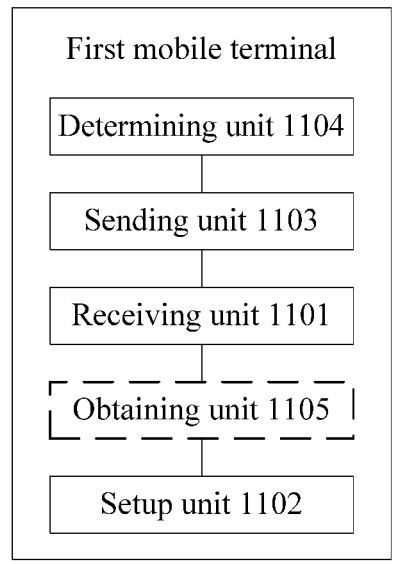
FIG. 16 is a schematic composition diagram of another first mobile terminal according to another embodiment of the present disclosure.

In this embodiment of the present disclosure, further, as shown in FIG. 16, the first mobile terminal may further include a sending unit 1103.

The sending unit 1103 is configured to: before the receiving unit 1101 receives the first neighbor discovery and setup message sent by the second mobile terminal, send a second neighbor discovery and setup message to the second mobile terminal, where the second neighbor discovery and setup message carries an identifier of the first mobile terminal.

In this embodiment of the present disclosure, further, the receiving unit 1101 is further configured to: before the sending unit 1103 sends the second neighbor discovery and setup message to the second mobile terminal, receive first indication information sent by a network device.

The first mobile terminal may further include a determining unit 1104.

The determining unit 1104 is configured to determine that the first mobile terminal is a mobile terminal having a multi-hop capability, where the first indication information is used by the network device to indicate to the mobile terminal that a communications network in which the network device is located supports communication between mobile terminals having the multi-hop capability, and the mobile terminal having the multi-hop capability is a mobile terminal having a capability of directly communicating with one or more mobile terminals.

In this embodiment of the present disclosure, further, the determining unit 1104 is further configured to: after the receiving unit 1101 receives the first indication information sent by the network device and the determining unit 1104 determines that the first mobile terminal is the mobile terminal having the multi-hop capability, determine that the first mobile terminal has a multi-hop requirement and/or determine that a multi-hop capability switch is in an enabled state.

In this embodiment of the present disclosure, further, the sending unit 1103 is further configured to: after the receiving unit 1101 receives the first indication information sent by the network device and the determining unit 1104 determines that the first mobile terminal is the mobile terminal having the multi-hop capability, send related information to the network device or send second indication information to the network device, where the related information is used by the first mobile terminal to apply to the network device for a multi-hop resource and/or is used by the first mobile terminal to indicate that the first mobile terminal has the multi-hop requirement, and the second indication information is used by the first mobile terminal to indicate to the network device that the first mobile terminal is the mobile terminal having the multi-hop capability.

The receiving unit 1101 is further configured to receive resource information sent by the network device, where the resource information includes information about a resource that is allocated by the network device to the first mobile terminal and that is required for sending the second neighbor discovery and setup message.

The sending unit 1103 is specifically configured to send the second neighbor discovery and setup message to the second mobile terminal by using the resource corresponding to the resource information received by the receiving unit 1101.

In this embodiment of the present disclosure, further, the first mobile terminal may further include an obtaining unit 1105.

The obtaining unit 1105 is configured to obtain resource information after the receiving unit 1101 receives the first indication information sent by the network device and the determining unit 1104 determines that the first mobile terminal is the mobile terminal having the multi-hop capability, where a resource corresponding to the resource information is preallocated by the network device to the first mobile terminal according to a quantity of all mobile terminals having the multi-hop capability in a current cell, and the resource information includes information about the resource that is allocated by the network device to the first mobile terminal and that is required for sending the second neighbor discovery and setup message.

The sending unit 1103 is specifically configured to send the second neighbor discovery and setup message to the second mobile terminal by using the resource corresponding to the resource information obtained by the obtaining unit 1105.

In this embodiment of the present disclosure, further, the sending unit 1103 is further configured to send second indication information to the network device before the obtaining unit 1105 obtains the resource information, where the second indication information is used by the first mobile terminal to indicate to the network device that the first mobile terminal is the mobile terminal having the multi-hop capability.

It should be noted that, for a specific working process of each function module in the first mobile terminal provided in this embodiment of the present disclosure, refer to specific descriptions of a corresponding process in the method embodiments. Details are not described again in this embodiment of the present disclosure.

It should be noted that the receiving unit 1101 in this embodiment may be a receiver of the first mobile terminal, and the sending unit 1103 may be a transmitter of the first mobile terminal. Alternatively, the receiving unit 1101 and the sending unit 1103 may be integrated to constitute a transceiver of the first mobile terminal. The setup unit 1102 may be a separately disposed processor, or may be integrated into a processor of the first mobile terminal for implementation. Alternatively, the setup unit 1102 may be stored in a memory of the first mobile terminal in a form of program code, and a processor of the first mobile terminal invokes and performs the foregoing functions of the setup unit 1102. Implementation of the determining unit 1104 and the obtaining unit 1105 are the same as that of the setup unit 1102, and the determining unit 1104 and the obtaining unit 1105 may be integrated into the setup unit 1102, or may be implemented independently. The processor herein may be a CPU or an ASIC, or be configured as one or more integrated circuits implementing this embodiment of the present disclosure.

The first mobile terminal provided in this embodiment of the present disclosure receives the first neighbor discovery and setup message that is sent by the second mobile terminal and that carries the identifier of the destination mobile terminal and the parameter information corresponding to the identifier of the destination mobile terminal, so as to set up the route to the destination mobile terminal according to the identifier of the destination mobile terminal and the parameter information corresponding to the identifier of the destination mobile terminal. In this way, when the first mobile terminal needs to communicate with the destination mobile terminal that is not directly adjacent to the first mobile terminal, the first mobile terminal can not only implement communication with the non-adjacent mobile terminal by using the route set up between the first mobile terminal and the destination mobile terminal, but also implement one-to-one communication by using the route set up between the first mobile terminal and the destination mobile terminal. Therefore, network overheads are reduced, and security of a data packet transmitted between the mobile terminals is ensured. In addition, because the neighbor discovery and setup message directly carries information required for setting up the route, route setup time and overheads are reduced, and an additional route setup process can be avoided. In this way, route setup complexity is reduced.

Figure 17:
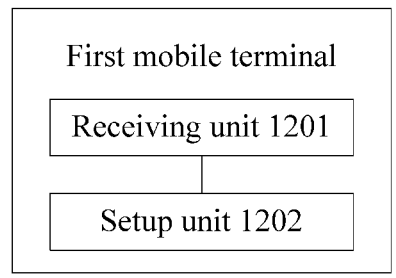
FIG. 17 is a schematic composition diagram of a first mobile terminal according to another embodiment of the present disclosure.

Another embodiment of the present disclosure provides a first mobile terminal. As shown in FIG. 17, the first mobile terminal may include a receiving unit 1201 and a setup unit 1202.

The receiving unit 1201 is configured to receive a first neighbor discovery and setup message sent by a second mobile terminal, where the first neighbor discovery and setup message carries an identifier of each mobile terminal in a mobile terminal set and signal quality information, of the mobile terminal, corresponding to the identifier of the mobile terminal, and the mobile terminal set includes the second mobile terminal and/or a mobile terminal that is directly or indirectly adjacent to the second mobile terminal.

The setup unit 1202 is configured to set up a relay route from the first mobile terminal to a network device according to the signal quality information of each mobile terminal that is received by the receiving unit 1201 and that is corresponding to the identifier of the mobile terminal in the mobile terminal set and signal quality information of the first mobile terminal.

Figure 18:
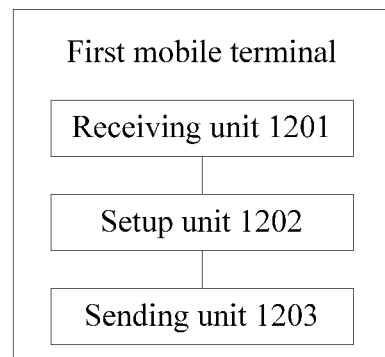
FIG. 18 is a schematic composition diagram of another first mobile terminal according to another embodiment of the present disclosure.

In this embodiment of the present disclosure, further, as shown in FIG. 18, the first mobile terminal may further include a sending unit 1203.

The sending unit 1203 is configured to send a second neighbor discovery and setup message to the second mobile terminal, where the second neighbor discovery and setup message carries an identifier of the first mobile terminal and the signal quality information, of the first mobile terminal, corresponding to the identifier of the first mobile terminal, and is used by a mobile terminal other than the first mobile terminal to set up a relay route to the network device.

It should be noted that, for a specific working process of each function module in the first mobile terminal provided in this embodiment of the present disclosure, refer to specific descriptions of a corresponding process in the method embodiments. Details are not described again in this embodiment of the present disclosure.

It should be noted that the receiving unit 1201 in this embodiment may be a receiver of the first mobile terminal, and the sending unit 1203 may be a transmitter of the first mobile terminal. Alternatively, the receiving unit 1201 and the sending unit 1203 may be integrated to constitute a transceiver of the first mobile terminal. The setup unit 1202 may be a separately disposed processor, or may be integrated into a processor of the first mobile terminal for implementation. Alternatively, the setup unit 1202 may be stored in a memory of the first mobile terminal in a form of program code, and a processor of the first mobile terminal invokes and performs the foregoing functions of the setup unit 1202. The processor herein may be a CPU or an ASIC, or be configured as one or more integrated circuits implementing this embodiment of the present disclosure.

The first mobile terminal provided in this embodiment of the present disclosure receives the first neighbor discovery and setup message that is sent by the second mobile terminal and that carries the identifier of each mobile terminal in the mobile terminal set and the signal quality information, of the mobile terminal, corresponding to the identifier of the mobile terminal, so as to set up the relay route from the first mobile terminal to the network device according to the signal quality information, of each mobile terminal, corresponding to the identifier of the mobile terminal in the mobile terminal set and the signal quality information of the first mobile terminal. Because the neighbor discovery and setup message directly carries information required for setting up the relay route, route setup time and overheads are reduced, and an additional route setup process can be avoided. In this way, route setup complexity is reduced.

Figure 19:
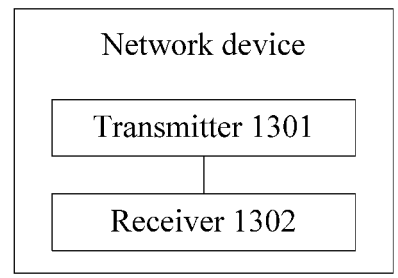
FIG. 19 is a schematic composition diagram of a network device according to another embodiment of the present disclosure.

Another embodiment of the present disclosure provides a network device. As shown in FIG. 19, the network device may include a transmitter 1301.

The transmitter 1301 is configured to send first indication information to a mobile terminal, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

In this embodiment of the present disclosure, further, the transmitter 1301 is specifically configured to:

send a system message to the mobile terminal, where the system message carries the first indication information, and the system message includes at least one of the following: a master information block MIB or a system information block SIB; or send a dedicated radio resource control RRC message to the mobile terminal, where the dedicated RRC message carries the first indication information; or send a management frame to the mobile terminal, where the management frame carries the first indication information; or send a management message to the mobile terminal, where the management message carries the first indication information.

In this embodiment of the present disclosure, further, the network device may further include a receiver 1302.

The receiver 1302 is configured to receive second indication information sent by the mobile terminal, where the second indication information is used by the mobile terminal to indicate to the network device that the mobile terminal is the mobile terminal having the multi-hop capability.

In this embodiment of the present disclosure, further, the receiver 1302 is further configured to: after the transmitter 1301 sends the first indication information to the mobile terminal, receive first related information sent by the mobile terminal, where the first related information is used by the mobile terminal to apply to the network device for a multi-hop resource and/or is used by the mobile terminal to indicate that the mobile terminal has a multi-hop requirement.

In this embodiment of the present disclosure, further, the receiver 1302 is further configured to: after the transmitter 1301 sends the first indication information to the mobile terminal, receive second related information sent by the mobile terminal, where the second related information is used by the mobile terminal to apply to the network device for release of a multi-hop resource and/or is used by the mobile terminal to indicate that the mobile terminal has no multi-hop requirement.

It should be noted that the network device described in this embodiment of the present disclosure may be applied to a wireless communications system, such as LTE system, Wi-Fi system, WIMAX system, or a cellular system related to the 3GPP. This is not specifically limited in this embodiment of the present disclosure.

It should be noted that, for a specific working process of each function module in the network device provided in this embodiment of the present disclosure, refer to specific descriptions of a corresponding process in the method embodiments. Details are not described again in this embodiment of the present disclosure.

The network device provided in this embodiment of the present disclosure sends, to the mobile terminal, the first indication information that is used to indicate that the communications network in which the network device is located supports communication between the mobile terminals having the multi-hop capability, so that the mobile terminal can perform a multi-hop-related operation with knowledge that a cell in which the mobile terminal is currently located supports multi-hop. This prevents the mobile terminal from performing an invalid multi-hop-related operation. Therefore, electricity of the mobile terminal is saved in a D2D mesh network.

Figure 20:
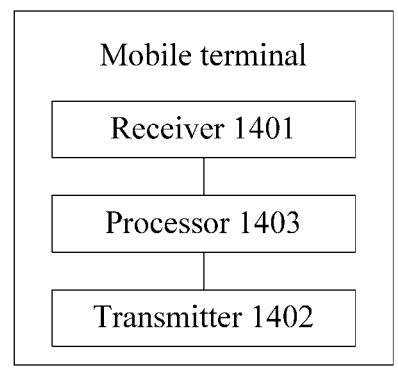
FIG. 20 is a schematic composition diagram of a mobile terminal according to another embodiment of the present disclosure.

Another embodiment of the present disclosure provides a mobile terminal. As shown in FIG. 20, the mobile terminal may include a receiver 1401.

The receiver 1401 is configured to receive first indication information sent by a network device, where the first indication information is used by the network device to indicate to the mobile terminal that a communications network in which the network device is located supports communication between mobile terminals having a multi-hop capability, and the mobile terminal having the multi-hop capability is a mobile terminal having a capability of directly communicating with one or more mobile terminals.

In this embodiment of the present disclosure, further, the mobile terminal may further include a transmitter 1402.

The transmitter 1402 is configured to send second indication information to the network device, where the second indication information is used by the mobile terminal to indicate to the network device that the mobile terminal is the mobile terminal having the multi-hop capability.

In this embodiment of the present disclosure, further, the transmitter 1402 is specifically configured to send the second indication information to the network device by using a dedicated radio resource control RRC message.

In this embodiment of the present disclosure, further, the transmitter 1402 is further configured to: after the receiver 1401 receives the first indication information sent by the network device, send first related information to the network device, where the first related information is used by the mobile terminal to apply to the network device for a multi-hop resource and/or is used by the mobile terminal to indicate that the mobile terminal has a multi-hop requirement.

In this embodiment of the present disclosure, further, the transmitter 1402 is specifically configured to send the first related information to the network device by using a dedicated RRC message.

In this embodiment of the present disclosure, further, the mobile terminal may further include a processor 1403.

The processor 1403 is configured to: before the transmitter 1402 sends the first related information to the network device, determine that the mobile terminal has the multi-hop requirement and/or determine that a multi-hop capability switch is in an enabled state.

In this embodiment of the present disclosure, further, the processor 1403 is further configured to determine that the mobile terminal has no multi-hop requirement and/or determine that the multi-hop capability switch is in a disabled state.

The transmitter 1402 is further configured to send second related information to the network device, where the second related information is used by the mobile terminal to apply to the network device for release of a multi-hop resource and/or is used by the mobile terminal to indicate that the mobile terminal has no multi-hop requirement.

It should be noted that the mobile terminal described in this embodiment of the present disclosure may be applied to a wireless communications system, such as LTE system, Wi-Fi system, WIMAX system, or a cellular system related to the 3GPP. This is not specifically limited in this embodiment of the present disclosure.

It should be noted that, for a specific working process of each function module in the mobile terminal provided in this embodiment of the present disclosure, refer to specific descriptions of a corresponding process in the method embodiments. Details are not described again in this embodiment of the present disclosure.

The mobile terminal provided in this embodiment of the present disclosure receives the first indication information that is sent by the network device and that is used to indicate that the communications network in which the network device is located supports communication between the mobile terminals having the multi-hop capability, so as to learn that a cell in which the mobile terminal is currently located supports multi-hop. Then, the mobile terminal can perform a multi-hop-related operation with knowledge that the cell in which the mobile terminal is currently located supports multi-hop. This prevents the mobile terminal from performing an invalid multi-hop-related operation. Therefore, electricity of the mobile terminal is saved in a D2D mesh network.

Figure 21:
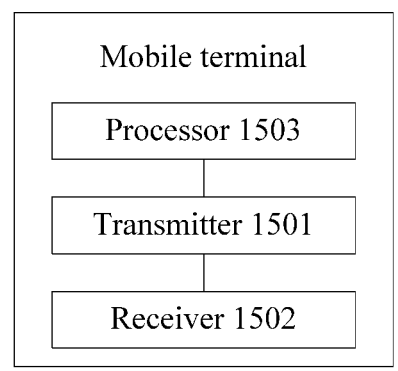
FIG. 21 is a schematic composition diagram of a mobile terminal according to another embodiment of the present disclosure.

Another embodiment of the present disclosure provides a mobile terminal. As shown in FIG. 21, the mobile terminal may include a transmitter 1501.

The transmitter 1501 is configured to send second indication information to a network device, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

In this embodiment of the present disclosure, further, the transmitter 1501 is specifically configured to send the second indication information to the network device by using a dedicated radio resource control RRC message.

In this embodiment of the present disclosure, further, the mobile terminal may further include a receiver 1502.

The receiver 1502 is configured to receive first indication information sent by the network device, where the first indication information is used by the network device to indicate to the mobile terminal that a communications network in which the network device is located supports communication between mobile terminals having the multi-hop capability.

In this embodiment of the present disclosure, further, the transmitter 1501 is further configured to: after sending the second indication information to the network device, send first related information to the network device, where the first related information is used by the mobile terminal to apply to the network device for a multi-hop resource and/or is used by the mobile terminal to indicate that the mobile terminal has a multi-hop requirement.

In this embodiment of the present disclosure, further, the transmitter 1501 is specifically configured to send the first related information to the network device by using a dedicated RRC message.

In this embodiment of the present disclosure, further, the mobile terminal may further include a processor 1503.

The processor 1503 is configured to: before the transmitter 1501 sends the first related information to the network device, determine that the mobile terminal has the multi-hop requirement and/or determine that a multi-hop capability switch is in an enabled state.

In this embodiment of the present disclosure, further, the processor 1503 is further configured to determine that the mobile terminal has no multi-hop requirement and/or determine that the multi-hop capability switch is in a disabled state.

The transmitter 1501 is further configured to send second related information to the network device, where the second related information is used by the mobile terminal to apply to the network device for release of a multi-hop resource and/or is used by the mobile terminal to indicate that the mobile terminal has no multi-hop requirement.

It should be noted that the mobile terminal described in this embodiment of the present disclosure may be applied to a wireless communications system, such as LTE system, Wi-Fi system, WIMAX system, or a cellular system related to the 3GPP. This is not specifically limited in this embodiment of the present disclosure.

It should be noted that, for a specific working process of each function module in the mobile terminal provided in this embodiment of the present disclosure, refer to specific descriptions of a corresponding process in the method embodiments. Details are not described again in this embodiment of the present disclosure.

The mobile terminal provided in this embodiment of the present disclosure sends, to the network device, the second indication information that is used to indicate that the mobile terminal is the mobile terminal having the multi-hop capability, so that the network device can perform a multi-hop-related operation with knowledge that the mobile terminal supports multi-hop. This prevents the network device from performing an invalid multi-hop-related operation. Therefore, system performance is improved.

Figure 22:
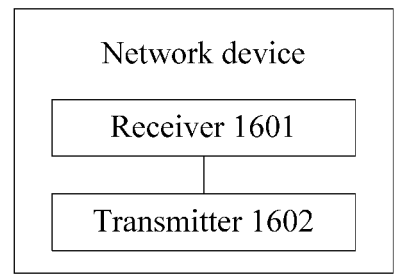
FIG. 22 is a schematic composition diagram of a network device according to another embodiment of the present disclosure.

Another embodiment of the present disclosure provides a network device. As shown in FIG. 22, the network device includes a receiver 1601.

The receiver 1601 is configured to receive second indication information sent by a mobile terminal, where the second indication information is used by the mobile terminal to indicate to the network device that the mobile terminal is a mobile terminal having a multi-hop capability, and the mobile terminal having the multi-hop capability is a mobile terminal having a capability of directly communicating with one or more mobile terminals.

In this embodiment of the present disclosure, further, the network device may further include a transmitter 1602.

The transmitter 1602 is configured to send first indication information to the mobile terminal, where the first indication information is used by the network device to indicate to the mobile terminal that a communications network in which the network device is located supports communication between mobile terminals having the multi-hop capability.

In this embodiment of the present disclosure, further, the transmitter 1602 is specifically configured to:

send a system message to the mobile terminal, where the system message carries the first indication information, and the system message includes at least one of the following: a master information block MIB or a system information block SIB; or send a dedicated radio resource control RRC message to the mobile terminal, where the dedicated RRC message carries the first indication information; or send a management frame to the mobile terminal, where the management frame carries the first indication information; or send a management message to the mobile terminal, where the management message carries the first indication information.

In this embodiment of the present disclosure, further, the receiver 1601 is further configured to: after receiving the second indication information sent by the mobile terminal, receive first related information sent by the mobile terminal, where the first related information is used by the mobile terminal to apply to the network device for a multi-hop resource and/or is used by the mobile terminal to indicate that the mobile terminal has a multi-hop requirement.

In this embodiment of the present disclosure, further, the receiver 1601 is further configured to: after receiving the second indication information sent by the mobile terminal, receive second related information sent by the mobile terminal, where the second related information is used by the mobile terminal to apply to the network device for release of a multi-hop resource and/or is used by the mobile terminal to indicate that the mobile terminal has no multi-hop requirement.

It should be noted that the network device described in this embodiment of the present disclosure may be applied to a wireless communications system, such as LTE system, Wi-Fi system, WIMAX system, or a cellular system related to the 3GPP. This is not specifically limited in this embodiment of the present disclosure.

It should be noted that, for a specific working process of each function module in the network device provided in this embodiment of the present disclosure, refer to specific descriptions of a corresponding process in the method embodiments. Details are not described again in this embodiment of the present disclosure.

The network device provided in this embodiment of the present disclosure receives the second indication information that is sent by the mobile terminal and that is used to indicate that the mobile terminal is the mobile terminal having the multi-hop capability, so as to learn that the mobile terminal supports multi-hop. Then, the network device can perform a multi-hop-related operation with knowledge that the mobile terminal supports multi-hop. This prevents the network device from performing an invalid multi-hop-related operation. Therefore, system performance is improved.

Figure 23:
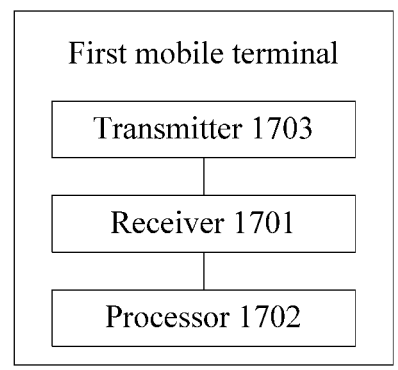
FIG. 23 is a schematic composition diagram of a first mobile terminal according to another embodiment of the present disclosure.

Another embodiment of the present disclosure provides a first mobile terminal. As shown in FIG. 23, the first mobile terminal may include a receiver 1701 and a processor 1702.

The receiver 1701 is configured to receive a first neighbor discovery and setup message sent by a second mobile terminal, where the first neighbor discovery and setup message carries an identifier of a destination mobile terminal and parameter information corresponding to the identifier of the destination mobile terminal, the second mobile terminal is a mobile terminal that is directly adjacent to the first mobile terminal, and the destination mobile terminal is a mobile terminal that is directly or indirectly adjacent to the second mobile terminal.

The processor 1702 is configured to set up a route to the destination mobile terminal according to the identifier of the destination mobile terminal and the parameter information corresponding to the identifier of the destination mobile terminal that are received by the receiver 1701.

In this embodiment of the present disclosure, further, the parameter information corresponding to the identifier of the destination mobile terminal is information about a hop count from the destination mobile terminal to the second mobile terminal, or the parameter information corresponding to the identifier of the destination mobile terminal is metric information of a distance between the destination mobile terminal and the second mobile terminal.

In this embodiment of the present disclosure, further, the first mobile terminal may further include a transmitter 1703.

The transmitter 1703 is configured to: before the receiver 1701 receives the first neighbor discovery and setup message sent by the second mobile terminal, send a second neighbor discovery and setup message to the second mobile terminal, where the second neighbor discovery and setup message carries an identifier of the first mobile terminal.

In this embodiment of the present disclosure, further, the receiver 1701 is further configured to: before the transmitter 1703 sends the second neighbor discovery and setup message to the second mobile terminal, receive first indication information sent by a network device.

The processor 1702 is configured to determine that the first mobile terminal is a mobile terminal having a multi-hop capability, where the first indication information is used by the network device to indicate to the mobile terminal that a communications network in which the network device is located supports communication between mobile terminals having the multi-hop capability, and the mobile terminal having the multi-hop capability is a mobile terminal having a capability of directly communicating with one or more mobile terminals.

In this embodiment of the present disclosure, further, the processor 1702 is further configured to: after the receiver 1701 receives the first indication information sent by the network device and the processor 1702 determines that the first mobile terminal is the mobile terminal having the multi-hop capability, determine that the first mobile terminal has a multi-hop requirement and/or determine that a multi-hop capability switch is in an enabled state.

In this embodiment of the present disclosure, further, the transmitter 1703 is further configured to: after the receiver 1701 receives the first indication information sent by the network device and the processor 1702 determines that the first mobile terminal is the mobile terminal having the multi-hop capability, send related information to the network device or send second indication information to the network device, where the related information is used by the first mobile terminal to apply to the network device for a multi-hop resource and/or is used by the first mobile terminal to indicate that the first mobile terminal has the multi-hop requirement, and the second indication information is used by the first mobile terminal to indicate to the network device that the first mobile terminal is the mobile terminal having the multi-hop capability.

The receiver 1701 is further configured to receive resource information sent by the network device, where the resource information includes information about a resource that is allocated by the network device to the first mobile terminal and that is required for sending the second neighbor discovery and setup message.

The transmitter 1703 is specifically configured to send the second neighbor discovery and setup message to the second mobile terminal by using the resource corresponding to the resource information received by the receiver 1701.

In this embodiment of the present disclosure, further, the processor 1702 is further configured to obtain resource information after the receiver 1701 receives the first indication information sent by the network device and the processor 1702 determines that the first mobile terminal is the mobile terminal having the multi-hop capability, where a resource corresponding to the resource information is preallocated by the network device to the first mobile terminal according to a quantity of all mobile terminals having the multi-hop capability in a current cell, and the resource information includes information about the resource that is allocated by the network device to the first mobile terminal and that is required for sending the second neighbor discovery and setup message.

The transmitter 1703 is specifically configured to send the second neighbor discovery and setup message to the second mobile terminal by using the resource corresponding to the resource information obtained by the processor 1702.

In this embodiment of the present disclosure, further, the transmitter 1703 is further configured to send second indication information to the network device before the processor 1702 obtains the resource information, where the second indication information is used by the first mobile terminal to indicate to the network device that the first mobile terminal is the mobile terminal having the multi-hop capability.

It should be noted that, for a specific working process of each function module in the first mobile terminal provided in this embodiment of the present disclosure, refer to specific descriptions of a corresponding process in the method embodiments. Details are not described again in this embodiment of the present disclosure.

The first mobile terminal provided in this embodiment of the present disclosure receives the first neighbor discovery and setup message that is sent by the second mobile terminal and that carries the identifier of the destination mobile terminal and the parameter information corresponding to the identifier of the destination mobile terminal, so as to set up the route to the destination mobile terminal according to the identifier of the destination mobile terminal and the parameter information corresponding to the identifier of the destination mobile terminal. In this way, when the first mobile terminal needs to communicate with the destination mobile terminal that is not directly adjacent to the first mobile terminal, the first mobile terminal can not only implement communication with the non-adjacent mobile terminal by using the route set up between the first mobile terminal and the destination mobile terminal, but also implement one-to-one communication by using the route set up between the first mobile terminal and the destination mobile terminal.

Therefore, network overheads are reduced, and security of a data packet transmitted between the mobile terminals is ensured. In addition, because the neighbor discovery and setup message directly carries information required for setting up the route, route setup time and overheads are reduced, and an additional route setup process can be avoided. In this way, route setup complexity is reduced.

Figure 24:
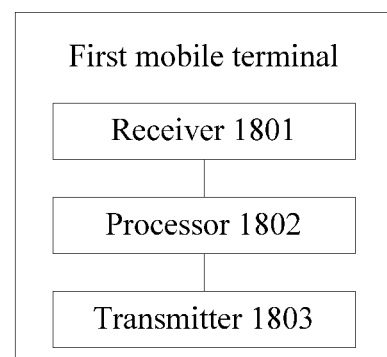
FIG. 24 is a schematic composition diagram of a first mobile terminal according to another embodiment of the present disclosure.

Another embodiment of the present disclosure provides a first mobile terminal. As shown in FIG. 24, the first mobile terminal may include a receiver 1801 and a processor 1802.

The receiver 1801 is configured to receive a first neighbor discovery and setup message sent by a second mobile terminal, where the first neighbor discovery and setup message carries an identifier of each mobile terminal in a mobile terminal set and signal quality information, of the mobile terminal, corresponding to the identifier of the mobile terminal, and the mobile terminal set includes the second mobile terminal and/or a mobile terminal that is directly or indirectly adjacent to the second mobile terminal.

The processor 1802 is configured to set up a relay route from the first mobile terminal to a network device according to the signal quality information of each mobile terminal that is received by the receiver 1801 and that is corresponding to the identifier of the mobile terminal in the mobile terminal set and signal quality information of the first mobile terminal.

In this embodiment of the present disclosure, further, the first mobile terminal may further include a transmitter 1803.

The transmitter 1803 is configured to send a second neighbor discovery and setup message to the second mobile terminal, where the second neighbor discovery and setup message carries an identifier of the first mobile terminal and the signal quality information, of the first mobile terminal, corresponding to the identifier of the first mobile terminal, and is used by a mobile terminal other than the first mobile terminal to set up a relay route to the network device.

It should be noted that, for a specific working process of each function module in the first mobile terminal provided in this embodiment of the present disclosure, refer to specific descriptions of a corresponding process in the method embodiments. Details are not described again in this embodiment of the present disclosure.

The first mobile terminal provided in this embodiment of the present disclosure receives the first neighbor discovery and setup message that is sent by the second mobile terminal and that carries the identifier of each mobile terminal in the mobile terminal set and the signal quality information, of the mobile terminal, corresponding to the identifier of the mobile terminal, so as to set up the relay route from the first mobile terminal to the network device according to the signal quality information, of each mobile terminal, corresponding to the identifier of the mobile terminal in the mobile terminal set and the signal quality information of the first mobile terminal. Because the neighbor discovery and setup message directly carries information required for setting up the relay route, route setup time and overheads are reduced, and an additional route setup process can be avoided. In this way, route setup complexity is reduced.

In addition, a computer readable medium is further provided, and includes a computer readable instruction for performing the following operations during execution: performing operations of step 101, step 201, step 301, step 401, step 501, step 502, step 601, and step 602 of the methods in the foregoing embodiments.

In addition, a computer program product is further provided, and includes the foregoing computer readable medium.

It should be understood that, in the embodiments of the present disclosure, sequence numbers of the foregoing processes do not indicate a performing sequence. A performing sequence of the processes should be determined according to functions and internal logic of the processes, but should not constitute any limitation on implementation processes of the embodiments of the present disclosure.

From descriptions of the foregoing implementations, it can be clearly understood by a person skilled in the art that, for ease and brevity of description, division of the foregoing function modules is merely an example for description. In actual application, the foregoing functions may be allocated, according to a requirement, to different function modules for implementation, that is, an internal structure of an apparatus is divided into different function modules to implement all or some of the functions described above.

In the several embodiments provided in this application, it should be understood that the disclosed apparatuses and methods may be implemented in other manners. For example, the apparatus embodiments described above are merely examples. For example, division of the modules or units is merely logical function division, and there may be another division manner in actual implementation. For example, multiple units or components may be combined or may be integrated into another apparatus, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate. Parts displayed as units may be one physical unit or multiple physical units, and may be located at one place or may be distributed at multiple different places. Some or all of the units may be selected according to an actual requirement, to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a readable storage medium. Based on such an understanding, the technical solutions of the embodiments of the application essentially, or the part contributing to the prior art, or all or a part of the technical solutions may be represented in a form of a software product. The software product is stored in a storage medium, and includes several instructions for instructing a device (which may be a single-chip microcomputer, a chip, or the like) or a processor to perform all or a part of the steps of the methods in the embodiments of the present disclosure. The foregoing storage medium includes various mediums that can store program code, such as a USB flash drive, a removable hard disk, a read-only memory (ROM), a random access memory (RAM), a magnetic disk, and an optical disc.

The foregoing descriptions are merely specific implementations of the embodiments of the application, but are not intended to limit the protection scope of the embodiments of the application. Any variation or replacement readily figured out by a person skilled in the art within the technical scope disclosed in the embodiments of the application shall fall within the protection scope of the embodiments of the application. Therefore, the protection scope of the embodiments of the application shall be subject to the protection scope of the claims.

What is claimed is:

1. A capability indication method, comprising:
sending, by a network device, first indication information to a mobile terminal, the first indication information indicating whether a communications network in which the network device is located supports, in a first cell in which the mobile terminal is located, communication between mobile terminals having a multi-hop capability;
wherein the sending the first indication information to the mobile terminal causes the mobile terminal to perform a valid multi-hop operation and avoid performing an invalid multi-hop operation in response to the first indication information indicating that the communications network supports multi-hop communication between the mobile terminals in the first cell: and
wherein the sending the first indication information to the mobile terminal causes the mobile terminal to reselect a second cell supporting multi-hop communication in response to the first indication information indicating that the communications network does not support multi-hop communication between the mobile terminals in the first cell.

2. The method according to claim 1, wherein sending the first indication information to the mobile terminal comprises performing at least one of:
sending, by the network device, a system message to the mobile terminal, wherein the system message carries the first indication information and comprises at least one of a master information block (MIB) or a system information block (SIB); or
sending, by the network device, a dedicated radio resource control (RRC) message to the mobile terminal, wherein the dedicated RRC message carries the first indication information.

3. The method according to claim 1, further comprising:
receiving second indication information from the mobile terminal indicating the mobile terminal has the multi-hop capability.

4. The method according to claim 1, wherein the method further comprises after sending, by the network device, the first indication information to the mobile terminal:
receiving, by the network device, first related information from the mobile terminal, wherein the first related information is used for applying to the network device for a multi-hop resource and/or indicating that the mobile terminal has a multi-hop requirement.

5. The method according to claim 1, wherein the method further comprises, after sending, by the network device, the first indication information to the mobile terminal:
receiving, by the network device, second related information from the mobile terminal, wherein the second related information applies to the network device for release of a multi-hop resource and/or indicates that the mobile terminal has no multi-hop requirement.

6. The method according to claim 1, wherein the valid multi-hop operation is a route setup operation comprising setting up a route through a second mobile terminal in the first cell to a target device for one-to-one communication with the target device prior to the one-to-one communication with the target device, wherein the target device is one of another network device or a third terminal in the first cell.

7. A capability indication method, comprising:
receiving, by a mobile terminal, first indication information from a network device the first indication information indicating whether a communications network in which the network device is located supports, in a first cell in which the mobile terminal is located, communication between mobile terminals having a multi-hop capability;
performing, by the mobile terminal, a valid multi-hop operation and avoiding performing an invalid multi-hop operation in response to the first indication information indicating that the communications network supports multi-hop communication between the mobile terminals in the first cell: and
reselecting, by the mobile terminal, a second cell supporting multi-hop communication in response to the first indication information indicating that the communications network does not support multi-hop communication between the mobile terminals in the first cell.

8. The method according to claim 7, further comprising:
sending, by the mobile terminal, second indication information to the network device for indicating that the mobile terminal has the multi-hop capability.

9. The method according to claim 8, wherein the second indication information is carried on a dedicated radio resource control (RRC) message.

10. The method according to claim 7, wherein the method further comprises, after receiving, by the mobile terminal, the first indication information from the network device:
sending, by the mobile terminal, first related information to the network device, wherein the first related information is used for applying to the network device for a multi-hop resource and/or for indicating that the mobile terminal has a multi-hop requirement.

11. The method according to claim 10, wherein the first related information is carried on a dedicated RRC message.

12. The method according to claim 10, further comprising, before sending, by the mobile terminal, the first related information to the network device:
determining, by the mobile terminal, that the mobile terminal has the multi-hop requirement and/or determining that a multi-hop capability switch is in an enabled state.

13. The method according to claim 12, further comprising:
determining, by the mobile terminal, that the mobile terminal has no multi-hop requirement and/or determining that the multi-hop capability switch is in a disabled state; and
sending, by the mobile terminal, second related information to the network device, wherein the second related information is used for applying to the network device for release of the multi-hop resource and/or indicating that the mobile terminal has no multi-hop requirement.

14. A communication apparatus, comprising:
a memory storing instructions; and
a processor coupled to the memory to execute the instructions to:
receive first indication information from a network device, the first indication information indicating whether a communications network in which the network device is located supports, in a first cell in which a mobile terminal is located, communication between mobile terminals having a multi-hop capability;
perform a valid multi-hop operation and avoid performing an invalid multi-hop operation in response to the first indication information indicating that the communications network supports multi-hop communication between the mobile terminals in the first cell: and
reselect a second cell supporting multi-hop communication in response to the first indication information indicating that the communications network does not support multi-hop communication between the mobile terminals in the first cell.

15. The apparatus according to the claim 14, wherein the processor further executes the instructions to:
send second indication information to the network device for indicating that the mobile terminal has the multi-hop capability.

16. The apparatus according to the claim 15, wherein the second indication information is carried on a dedicated radio resource control (RRC) message.

17. The apparatus according to the claim 14, wherein the processor further executes the instructions to:
send first related information to the network device, wherein the first related information is used for applying to the network device for a multi-hop resource and/or indicating that the mobile terminal has a multi-hop requirement.

18. The apparatus according to the claim 17, wherein the first related information is carried on a dedicated RRC message.

19. The apparatus according to the claim 17, wherein the processor further executes the instructions to:
determine that the mobile terminal has the multi-hop requirement and/or determine that a multi-hop capability switch is in an enabled state.

20. The apparatus according to the claim 19, wherein the processor further executes the instructions to:
determine that the mobile terminal has no multi-hop requirement and/or determine that the multi-hop capability switch is in a disabled state; and
send second related information to the network device, wherein the second related information is used for applying to the network device for release of the multi-hop resource and/or for indicating that the mobile terminal has no multi-hop requirement.

* * * * *